United States Patent [19]

Hernandez et al.

[11] Patent Number: 5,365,787
[45] Date of Patent: Nov. 22, 1994

[54] NONINVASIVE METHOD AND APPARATUS FOR DETERMINING RESONANCE INFORMATION FOR ROTATING MACHINERY COMPONENTS AND FOR ANTICIPATING COMPONENT FAILURE FROM CHANGES THEREIN

[75] Inventors: Walter Hernandez, Potomac; Edward Page, Kensington, both of Md.

[73] Assignee: Monitoring Technology Corp., Fairfax, Va.

[21] Appl. No.: 769,821

[22] Filed: Oct. 2, 1991

[51] Int. Cl.$^5$ ............... G01H 1/00; G01H 11/00; G08B 23/00; G01N 29/00
[52] U.S. Cl. ............... 73/660; 324/226; 324/207.25; 340/683
[58] Field of Search ............... 324/226, 227, 207.26, 324/207.25, 207.22, 207.13, 207.11; 73/660, 657, 658; 340/683

[56] References Cited

U.S. PATENT DOCUMENTS 4,426,641  1/1984  Kurihara et al. ............... 73/660

FOREIGN PATENT DOCUMENTS 0666454  6/1979  U.S.S.R. ............... 73/660

*Primary Examiner*—Walter E. Snow
*Attorney, Agent, or Firm*—Richard H. Stern

[57] ABSTRACT

The present invention provides a method and system for analyzing signals generated by rotating components that slip in a rotating machine and for detecting faults in those components. Pulses from a shaft encoder serve as an external clock in digitizing the signal data. A fixed number of data samples are thereby acquired for each complete rotation of the rotating shaft of the machine. Complex spectra are provided for data records of a fixed length with the first sample of each data record always beginning at the same point relative to the shaft angular orientation. Signal-processing means multiply pairs of signal spectral components so that the complex products produced by the data for the component of interest has a fixed phase relative to the shaft orientation. The resulting signal is then shaft synchronously averaged over a large data set so that the sum of the spectral signal components for the rotating component of interest converges to finite constant values whereas other signal contributions tend toward zero. This signal function average is analyzed for the presence of component faults and other attributes. This method and system is capable of analyzing and detecting defects in slipping machine-components, even in the presence of high background noise that would normally prevent such analysis.

61 Claims, 6 Drawing Sheets

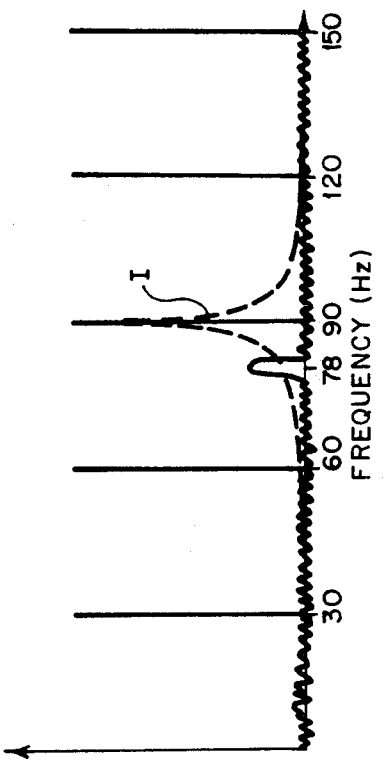
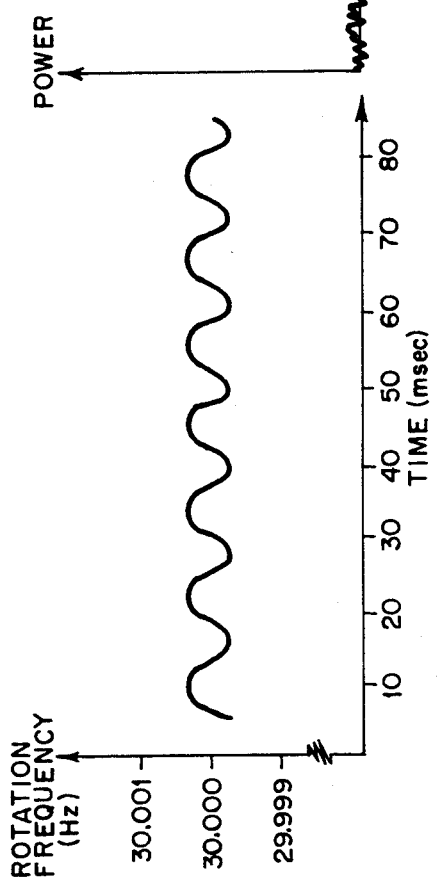
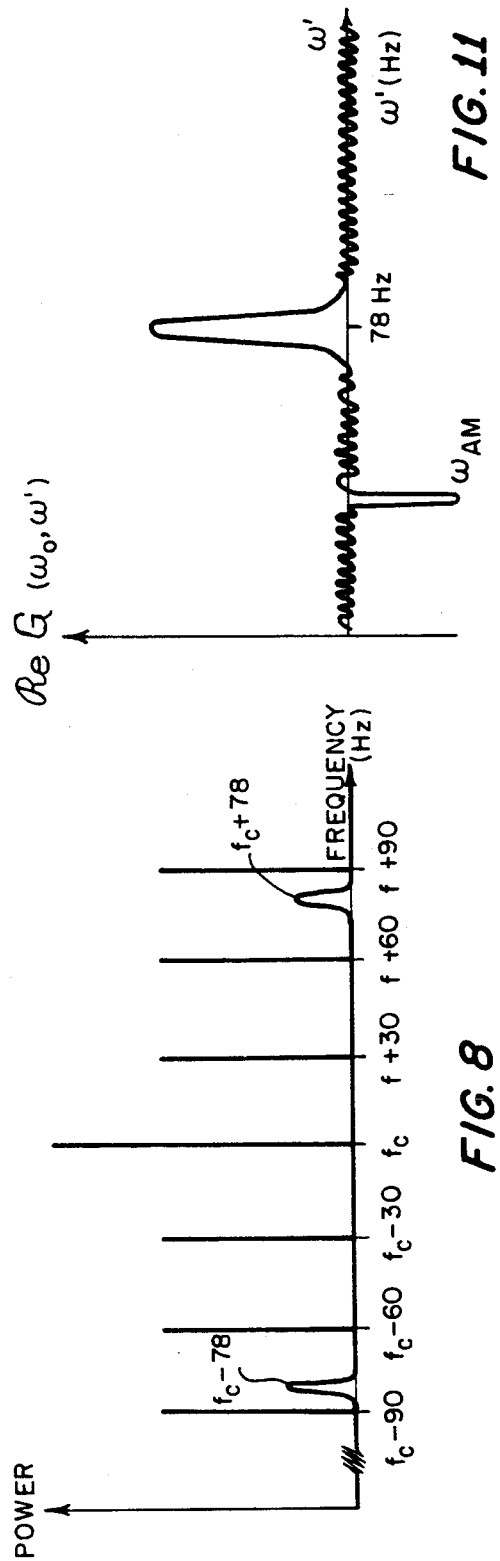

NONINVASIVE METHOD AND APPARATUS FOR DETERMINING RESONANCE INFORMATION FOR ROTATING MACHINERY COMPONENTS AND FOR ANTICIPATING COMPONENT FAILURE FROM CHANGES THEREIN

BACKGROUND

This invention concerns rotating machines, such as turbines and pumps, which are susceptible to catastrophic failure in operation. Such failure may be due to shaft cracking or cracking of a component (such as a blade or rotor) attached to the shaft. The invention concerns means for noninvasively monitoring such machinery to anticipate occurrence of such failure, so that the machinery can be shut down before the failure occurs.

Attempts have been made in the past to detect cracks in pump shafts and turbine blades, but the effectiveness of the methods attempted has not been established. Moreover, these methods are considered impractical for wide application. A method investigated by Pratt & Whitney involved detecting passage of individual turbine blades by their interruption of a light beam, synchronizing blade signals with an external reference, and monitoring the difference between actual and expected blade rotation angles. Hardware proposed to implement this idea included fiber optic probes to be installed inside the turbine to transmit and receive light beams, and related electronic apparatus. This system's requirement of installing optic sensors deep within a turbine and then routing signals out of that environment posed serious implementation difficulties because of the harsh, live-steam environment in which the apparatus had to be placed.

Another method, under investigation by Liberty Technology Center, involves installing Doppler instrumentation within a turbine. This method poses similar implementation difficulties because of the same harsh environment problem.

Noninvasive methods have been proposed, also, based on use of externally placed vibration sensors. However, the multitude of vibration frequencies present in such signals has been a major obstacle to extracting signals representative of blade failure conditions.

OBJECTS AND SUMMARY OF THE INVENTION

It is therefore an object of this invention to provide a noninvasive method of measuring vibration resonance information about rotating machinery shafts and components attached thereto. The term "measuring resonance information," as used here, refers both to determining average frequencies of vibration resonant modes and also to determining other characteristics associated with vibration resonances, such as variance of the resonance frequency curve around the mean, skewness of the resonance curve around the mean, and kurtosis (peakedness) of the resonance curve around the mean, as well as methods of historically evaluating such data to determine whether a significant change in such characteristics is occurring.

A noninvasive method is desired here to avoid the problems created by the harsh internal environment of many large machines, such as the live-steam environment inside a steam turbine. A noninvasive method is also desired to facilitate retrofitting existing equipment and also to facilitate possible modification or repair of the monitoring equipment.

A further object of the invention is to provide a reliable automatic method of predicting component failure before it occurs, and to do so during regular operation of the equipment. This serves several purposes. First, the rotating machinery system can be kept in continuous operation with minimal down time for post-failure repair (which typically takes more time than replacement of a defective part before catastrophic failure, particularly if such failure results in damage to other parts in addition to the defective part).

In addition, down time is avoided that would otherwise have to be incurred for nonscheduled inspections to be made to examine or test components for cracks in order to anticipate failure before it occurs. Further, down time is saved that would be incurred while ordering and waiting for expensive parts that are not inventoried.

The present invention realizes these objectives using the novel approach of measuring signals associated with modulation of shaft rotation frequency. Such modulation is induced by resonant oscillatory motion of rotating components, such as blades and the shaft itself. The signals are processed in accordance with the invention to provide further signals indicative of changes in resonant responses of components, which are associated with changes in blade and shaft structure. At least three kinds of change in blade and shaft structure cause changes in the resonant frequencies of these elements. Chemical and metallurgical changes can cause stiffening, which increases resonant frequencies. Cracking and corrosion of blades cause their resonant frequencies to decrease.

The modulation signals of interest are often at a very low level. For example, resonances of turbine blades may modulate the 30 Hz fundamental of the main shaft of a 4-pole turbine-generator set by $\pm 0.001$ Hz or less. Further, these signals are contaminated by noise and other signals. It is therefore a further object of the invention to separate the signals of interest from noise and undesired signals, and circuitry for that purpose is disclosed.

A further object of the invention is to implement procedures for identifying changes in resonant vibration characteristics, so as to anticipate failure that may result from factors of which such changes are symptomatic. Circuitry and procedures for monitoring and identifying such changes in resonant vibration characteristics are therefore disclosed.

A number of different implementations of the invention, and of various aspects thereof, are disclosed in the specification. Further empirical data may suggest variations on these implementations, as well as as-yet unrecognized advantages that certain implementations may possess relative to others. However, at this time the inventors consider the following implementation to be preferable:

A sensor is used to detect instantaneous shaft rotation frequency of a rotating machine such as a steam turbine driving a 4-pole alternator rotating at 30 rotations per second. A magnetic transducer detects passage of gear teeth on a bull gear (for example, an 80-tooth gear) with which existing such turbines are customarily equipped. The transducer provides blip-like signals (hereafter termed "pulses") with some concommitant noise. The pulses are advantageously conditoned by conventional means to provide cleaner pulses. The transducer provides an integral number of pulses per shaft rotation. (For example, 80 pulses per rotation, which provides a pulse repetition rate of 2400 pulses per second for the foregoing 30 Hz turbine shaft. Throughout this summary, a 30 Hz shaft rotation rate and 2400 pulse per second rate will be used illustratively.)

The pulses are fed to a pulse-converter circuit that provides frequency-to-voltage conversion. Accordingly, an analog voltage is provided that is representative of instantaneous pulse frequency, and thus also of instantaneous shaft rotation-frequency. The analog voltage is then converted to a digital signal. That signal includes substantial random noise and interference signals at 30 Hz and harmonics thereof. In addition, it contains signals representative of the modulation frequencies of interest (for example, 78 Hz), but at a very low level (for example, 1 part in 100,000 of the signal amplitude or less).

A set of the digital signals is subjected to Discrete Fourier Transform (DFT) analysis, in which a data record is made for a set of signals containing data from M (typically 100) complete shaft rotations. The analog-to-digital converter is controlled to read the analog voltage for an integral number of data points for each complete shaft rotation. This is done by using the sensor pulses to clock the analog-to-digital converter. Then, when the data segment length is set to M complete rotations, the rotation frequency and its harmonics (30 Hz, 60 Hz, 90 Hz, etc.) fall precisely on spectral bins of the DFT analysis. That in turn confines such harmonic interference to those spectral bins and avoids leakage to other bins.

The result of this analysis is a DFT spectrum containing peaks at the shaft harmonics and also at the modulating frequencies of interest. Spectral data related to the modulating frequencies are recorded and monitored for trend analysis. Zooming in on the resonant frequencies of a set of 60 to 100 or more large blades of one stage of a steam turbine shows a distribution of resonant frequencies with a somewhat bell-shaped distribution (for example, 78 Hz with a ±2 Hz bandwidth). The shape of the resonance curve is appropriately analyzed for skewness about the mean, variance, kurtosis, etc. The resonance curve is also appropriately monitored for formation of secondary peaks as shoulders on the main peak. Changes in these characteristics over time are considered indicative of physical changes in the turbine blades or subsets thereof. Those in the industry consider such changes to be of interest and a cause for concern that blade deterioration may be occuring that could lead to blade failure.

An additional signal-processing procedure is considered particularly effective in eliminating noise other than shaft rotation-frequency harmonics. Lowpass-filtered sensor pulses are fed directly to an analog-to-digital converter without frequency-voltage conversion, and a computer controls the digital conversion electronics to provide an integral number of data points during each complete shaft rotation. When DFT (or FFT) analysis is applied to data recorded from such an integral number of shaft rotations, shaft harmonic interference is greatly reduced. Signals in the complex spectrum of such a DFT analysis are then subjected to bispectrum-based analysis procedures that emphasize amplitude of signals originating from true sources of shaft-rate modulation of interest and minimize amplitude contributions of signals from other sources.

BRIEF DESCRIPTION OF DRAWINGS

FIG. 3a shows signals P from a magnetic sensor. FIG. 3b shows conditioned signals P' corresponding to sensor signals P. FIG. 3c shows sawtooth and averaged signals corresponding to sensor signals P', resulting from frequency-to-voltage conversion procedures.

FIG. 6 shows a 30 Hz fundamental shaft rotation frequency modulated by an 78 Hz blade resonant frequency.

FIG. 7 shows a spectrum resulting from processing an analog voltage signal derived by frequency-voltage conversion.

FIG. 8 shows a spectrum resulting from processing conditioned pulses without a prior frequency-voltage conversion.

FIG. 11 is a plot of the spectrum resulting from use of the so-called "real part of $G(w',w_o)$" technique.

DETAILED DESCRIPTION OF PREFERRED EMBODIMENTS OF INVENTION

I. General Configuration of Apparatus

Figure 1:
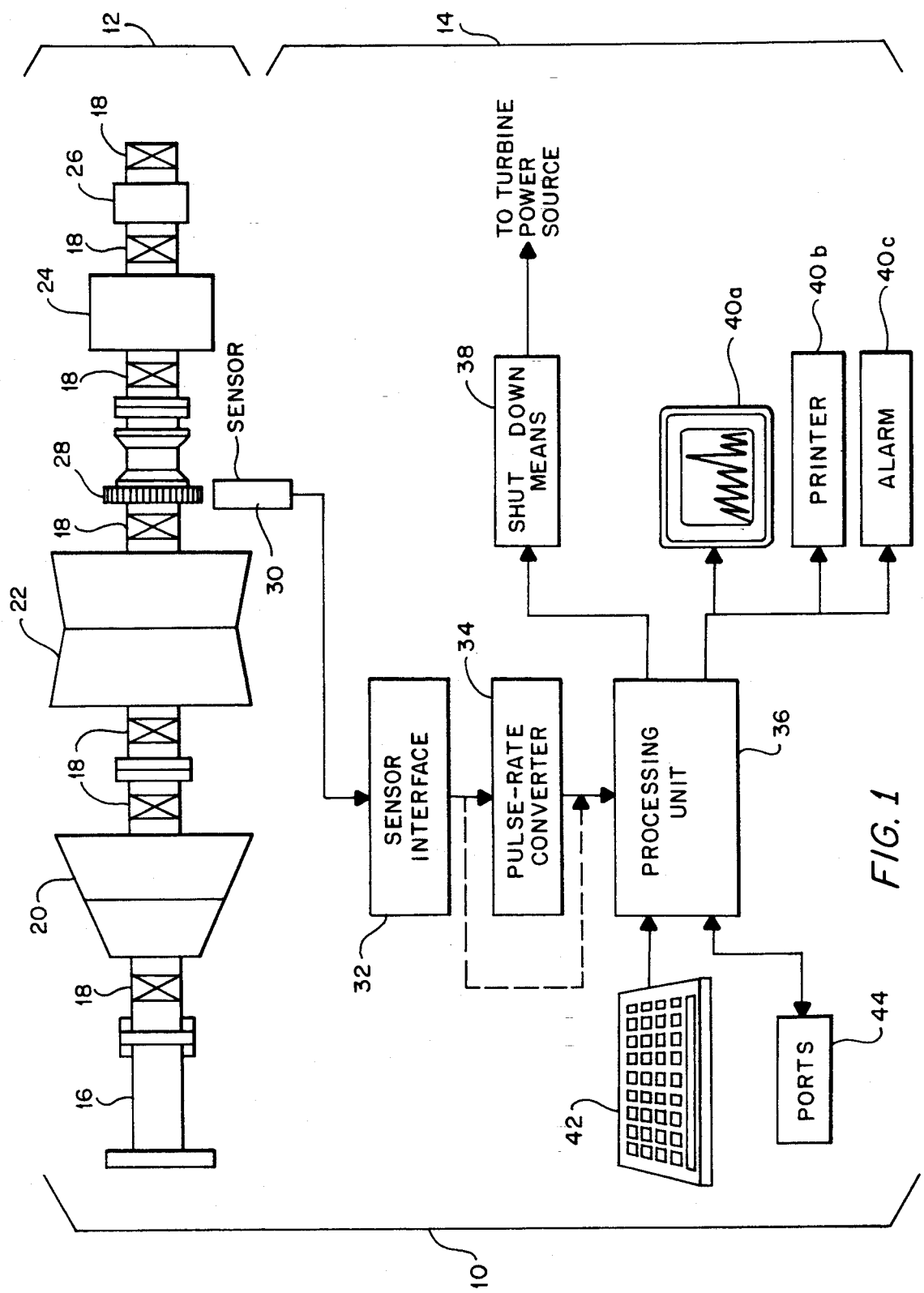
FIG. 1 shows a system comprising a horizontally mounted low-pressure steam turbine and generator, together with a control system in accordance with the invention.

As shown in FIG. 1, a rotating machinery system 10 includes electric power generation system 12 and control system 14.

Steam is delivered to electric power generation system 12 from a steam source (not shown). System 12 comprises a main shaft 16, mounted in bearings 18. Low-pressure turbine 20, high-pressure turbine 22, generator 24, and exciter 26 are connected on shaft 16. A bull gear 28 is also mounted on shaft 16. Bull gear 28 has N teeth. (A typical turbine shaft's bull gear has from 60 to 140 teeth.) The foregoing components of system 12 are conventional devices typically found on a turbine-generator set.

Control system 14 comprises sensor 30, sensor interface 32, pulse-rate converter 34, processing unit 36, and various units peripheral to processing unit 36, which are described below. Sensor 30 provides a signal representative of shaft rotation rate, as described below in section II. That signal is conditioned and processed by sensor interface 32, pulse-rate converter 34, and processing unit 36 to provide resonance information—data about resonant vibration characteristics over time—for shaft 16 and turbine blades of turbine 22, and to provide information about changes that occur in such data as described below in sections III–V.

Figure 2:
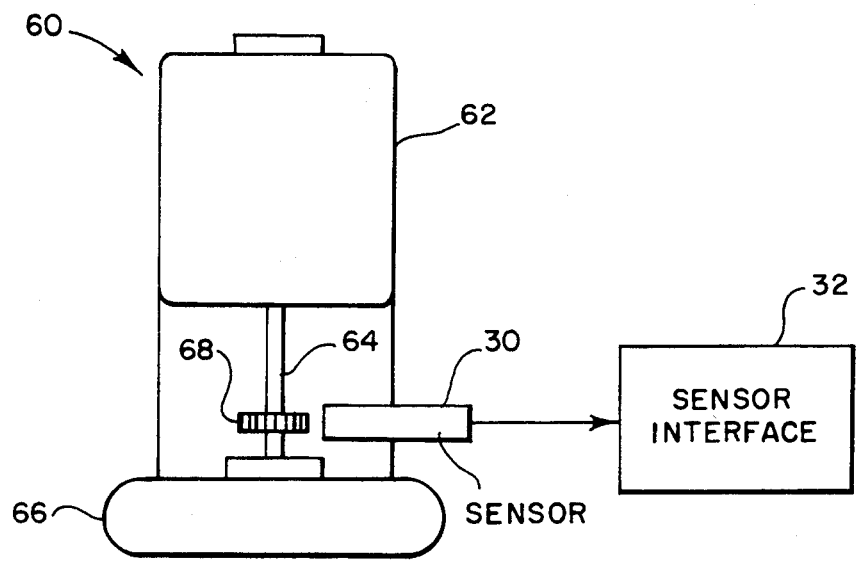
FIG. 2 shows a portion of a similar system comprising a vertically mounted electric pump, together with the sensor and sensor interface portions of a control system in accordance with the invention.

In FIG. 2, an implementation is shown for providing resonance information primarily about the shaft of a vertical pump system (such as a coolant pump). Here pump system 60 comprises an electric motor 62, having a shaft 64, to which pump 66 is mounted. An encoder gear 68 is also mounted to shaft 64, and it operates in a manner similar to bull gear 28 in FIG. 1. Sensor 30 and sensor interface 32 cooperate with gear 68 in a like manner as that described above. The other parts of the system are not shown again in FIG. 2, since they operate in the same manner as in FIG. 1.

While the steam turbine system of FIG. 1 was described in terms of a horizontal shaft orientation, the invention is in no way restricted to such operation. The invention operates in the same way for a vertically-oriented turbine, and it is also suitable for use with hydraulic and gas turbines in the same manner as described for the steam turbine of FIG. 1. The invention is also applicable to other types of rotating equipment having elements, such as propeller blades, helicopter rotors, and pump vanes, that may resonate.

As explained in greater detail below, turbine blades have resonant vibration modes and they oscillate as they rotate around their shaft axis. The oscillation alternately imparts and takes angular momentum from the shaft and thus the entire rotating system. When a blade imparts angular momentum to the system, the shaft speeds up slightly; when a blade takes angular momentum from the system, the shaft slows down slightly. The result is to vary the rate of angular rotation of the shaft by a slight amount, at the resonant frequencies of the blades. A like resonance effect occurs as a result of excitation of shaft torsional resonant modes. Indeed, the principle extends to any rotating system having components that can be excited in a resonant mode so that they oscillate and then impart angular momentum to, and take it from, the rest of the rotating system. The instrumentation and signal-processing apparatus of this invention uses the foregoing changes in rate of angular rotation to ascertain the resonant frequencies of the oscillating components of the rotating system, as explained below in the following sections of the specification.

The principal discussion herein is directed to machines (such as turbines and pumps) having rotating parts that extend radially outward from a shaft and are rotated by it. However, the invention can be practiced with any rotating part that is attached to a shaft and imparts angular momentum to the shaft at resonant vibration frequencies of the part. Thus, a disk or annular part attached to a shaft can modulate shaft rotation frequency by resonant vibrations of the part. Indeed, as pointed at in various places in this specification, the shaft itself has resonant frequencies (associated with torsional vibration) and its own oscillations modulate its rotation frequency at such frequencies. Thus, the invention is not restricted to radially extending machine components but instead comprehends any component that the shaft of a rotary machine rotates, and from which the shaft receives angular momentum at a resonant frequency of the component.

In addition, the invention extends to systems not having a conventional, longitudinally-continuous, cylindrical shaft. The system may have a camshaft, instead, in which the shaft is not straight but is zig-zagged or labyrinthine. Moreover, the system need not have a conventional shaft at all, as in the case of a pinwheel-like device, such as a radiometer, in which blades or rotors rotate around an axis to which they are not affixed. The basic defining characteristic of the rotating machines to which the invention is applicable is that the machine must have one or more components that can be excited to oscillate in one or more resonant modes, and that the oscillating component(s) must be able to impart angular momentum to the rotating system and withdraw it, in the course of such oscillations.

II. Sensor

Referring again to FIG. 1, sensor 30 is preferably a magnetic transducer picking up the motion of the teeth of a steel gear as they pass the transducer. But the sensor may be implemented instead as a photoelectric detector or other optical sensing device, as a proximity (capacitance or eddy-current) detector, as a tachometer producing an output whose amplitude is proportional to shaft speed, or any other convenient means of detecting angular rotation frequency of shaft 16. However, the sensor is preferably one capable of responding directly to shaft rotation rate. Thus, the inventors have not found it practical to use accelerometers or vibration pickups to measure modulation of shaft rotation rate by components rotated by the shaft, because they pick up too much noise from other vibrations in the system and this sensor output does not lend itself to practical extraction of instantaneous shaft rotation rate data.

Laser re-emission sensor

Other sensors responding directly to rotation rate include devices measuring Doppler shift of laser beams (or beams of another source of coherent electromagnetic radiation, such as a MASER) reflected off the surface of the rotating shaft, where the shaft absorbs and re-emits the beam at a new higher or lower frequency depending on direction and rate of rotation. The frequency is shifted in accordance with whether the surface speed of shaft 16—$rd\theta/dt$, where r is shaft radius and $\theta$ is shaft angle in radians—adds to or subtracts from laser wave-length before reemission.

Magnetic domain sensor

Still other such sensors that may be used include electromagnetic devices that induce magnetic domains into the steel shaft's surface and detect such fields. Characteristics of the induced field that indicate shaft surface speed can be obtained by processing the output from an electromagnetic sensor that senses the shaft surface's induced field as it rotates past the sensor. For example, a 10 KHz pulse oscillator (probe) can be positioned near the shaft at a convenient point. Assume that the shaft has a 36-inch circumference; an electromagnetic sensor is placed at the same longitudinal location but spaced 10° angularly past the probe; that represents 1 inch of shaft surface. If the shaft rotates at 30 Hz, in 1 msec the probe induces 10 domains into the shaft surface, spaced along an arc of approximately 1 inch. Thus, the sensor reads spacings between domains approximately 1 msec after the probe induces them. (The domains fade away before a complete shaft rotation occurs or a conventional means to demagnetize these domains can be used if this does not occur.) If the shaft slows down 0.001% in approximately 1 msec, the spacings between domains will increase approximately 10 nsec.

Thus, a change in shaft rotation frequency will appear as a change in time elapsed between detection by the sensor of successive induced magnetic domains. This information is processed by conventional means to provide signals representative of instantaneous shaft rotation frequency.

Bull-gear magnetic sensor

Figure 3A:
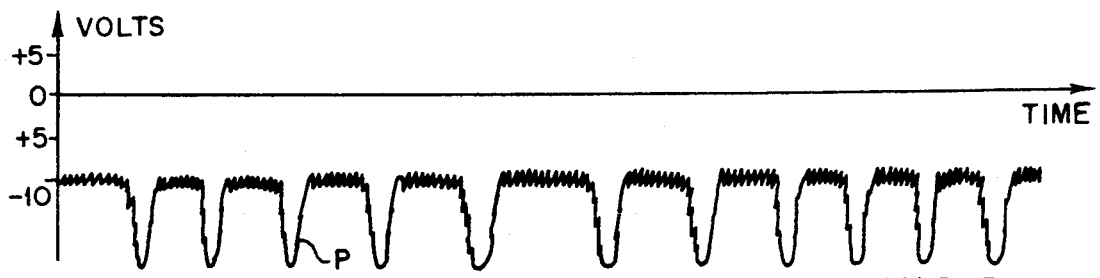
FIG. 3a–c shows waveforms that occur in sensor and demodulation circuitry utilized in the invention.

In the presently preferred magnetic transducer implementation of the sensor, as each of the N teeth of bull gear 28 passes sensor 30, the tooth induces a "blip-like" signal (hereinafter referred to as a "pulse") representative of shaft rotation. Thus, each time a tooth passes, a pulse is generated that indicates that the shaft has rotated another approximately 360°/N. The pulses produced by sensor 30 are shown in FIG. 3a as pulses P. As a practical matter, the teeth of a bull gear are not spaced at perfectly equal angular intervals, so that each pulse represents an increment of angular rotation that is (360°/N) ±x, where x is a small variation. These small variations give rise to spurious modulation signals ("interference") that appear in Fourier Transform spectrums as harmonics of the 30 Hz or other fundamental shaft rotation frequency. Such interference is reduced by signal-processing expedients discussed below.

Sensor interface 32 activates sensor 30 and conditions the analog signal output by filtering, amplification, and dc level-shifting. Interface 32 converts pulses P of FIG. 3a to pulses P' of FIG. 3b, which are "cleaned up" versions of pulses P of FIG. 3a. Interface 30 is implemented by any of a number of conventional circuits, whose application here is obvious to persons of ordinary skill in circuit design. This circuitry eliminates noise and insures one and only pulse P' for one pulse P.

Optical/magnetic tape sensor

Figure 4:
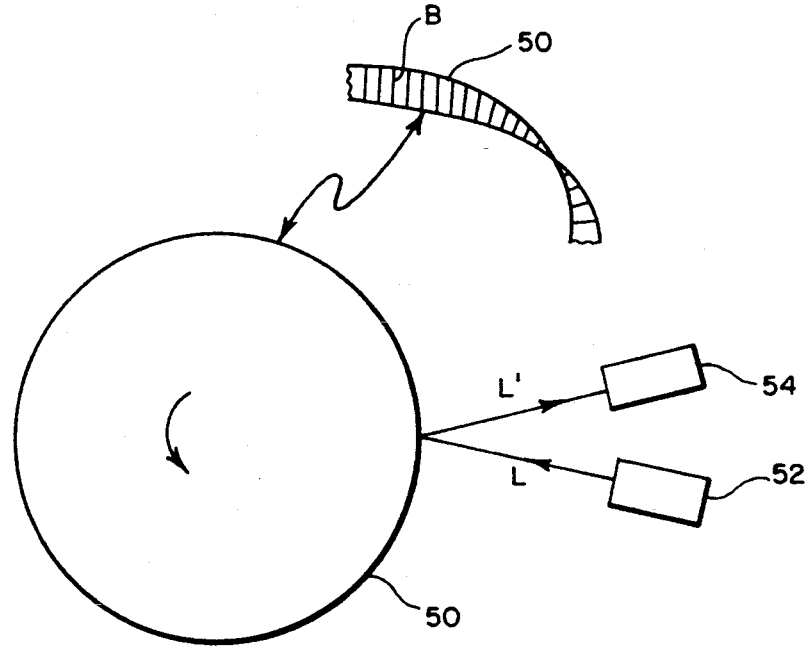
FIG. 4 shows an optical sensor device.

As indicated above, other forms of sensor can be used in practicing the invention, and the invention is not limited to use with the magnetic sensor described above. For example, as shown in FIG. 4, a tape 50 having reflecting bands B at regular intervals can be epoxyed or otherwise affixed to the main shaft of the turbine with bands B parallel to the axis of the shaft. A laser or light beam 52 then interrogates tape 50 with pulses L. The light frequency may be visible, UV, or IR. Pulses L are reflected off bands B of tape 50 as pulses L' and are received by receiver 54. (It is preferable that tape 50 have approximately the same thermal coefficient of expansion as the shaft to which it is affixed, so that it will not deform, thereby introducing a noise signal.)

Tape 50 may instead be magnetically "marked," that is, have small magnetic zones affixed thereto, so that the tape can actuate a magnetic sensor. The magnetic-sensor approach has the advantage of being less sensitive to the presence of grease and dirt than an optical sensor. Both the optical and magnetic band approaches are advantageous when a bull gear is not available at a desired shaft location or when a number of pulses per rotation is desired that differs from the number of teeth on the gear.

Nyquist constraint

A constraint on selection of pulse-producing sensors should be noted. The kind of signal processing and analysis used in the invention, described below, calls for a sampling rate for the parameter being measured (shaft rotation frequency as modulated by resonant-mode frequencies of shaft and blades) that is well in excess of the highest frequency of interest. Monitoring of large steam-turbine blades requires detection of shaft-speed modulations up to 200 Hz or higher. An 80-tooth bull gear provides 2400 pulses per sec (80 teeth×30 Hz). According to the Nyquist Theorem, that 2400 pulses/sec allows analysis of modulation signals up to 1200 Hz. The integration time constant of the frequency-to-voltage converter used here (described below) reduces this frequency to the 400 to 600 Hz range. That is two to three times the frequencies required (200 Hz) for large steam-turbine blades, so that there is no problem. However, this factor would have to be taken into account in selecting sensor implementations for other rotating machines having different frequencies of interest.

AC- output detector

In principle, the modulation of angular rotation frequency of the shaft induced by turbine blade oscillations could be extracted from the 60 Hz output of generator 24. However, by that stage of the system, the modulating-frequency components induced by blade resonance have been greatly filtered out to very low signal levels by mechanical and other filtering elements in the system. Nevertheless, use of demodulation of AC output from a turbine-generator set, or an equivalent signal, is considered within the scope of the invention.

Thus, an approximately 60 Hz signal can be taken from generator 24. (An electric power generator operates at too high a voltage to be used directly, and must be stepped down for the present purpose. Typically, power alternators have associated with them step-down transformers that provide low-voltage signals.) That provides a signal representative of instantaneous shaft rotation-frequency, which includes signals representative of modulation of shaft rotation-frequency caused by resonant oscillations of the shaft or other rotating elements. The difference between that frequency and exactly 60 Hz represents the signal of interest. The difference signal of interest can be obtained by any of several conventional processing signal-techniques based on signal phase comparison with reference signals and the extraction of instantaneous frequency measurements.

The foregoing sensors are referred to as providing signals "representative of angular rotation" of the shaft of a rotary machine. That concept is intended to include provision of signals indicative of absolute value of shaft rotation rate or change in shaft rotation rate, and also to include absolute value of shaft angle or change in shaft angle. Thus, to monitor modulations in shaft rotation rate caused by vibration resonances of parts such as turbine blades and shafts, it may not be necessary to determine whether the shaft is rotating at 30 Hz or 31 Hz. What needs to be measured is the modulation, for that is what is indicative of the vibration resonances of interest. Hence, a sensor that is capable of accurately picking up changes in shaft rotation frequency can be effective for purposes of the invention irrespective of whether the sensor is capable of accurately picking up absolute shaft rotation frequency. By the same token, sensors useful for practicing the invention may accurately read changes in shaft angle without also accurately reading absolute shaft angle.

If the application warrants, additional sensors and shaft elements to cooperate with them may be retrofitted to other shaft positions along the shaft axis, which may provide enhanced sensitivity for measuring the resonant frequencies of interest. The inventors consider this expedient a matter of design choice and not a part of the invention.

III. Demodulation

The inventors' preferred embodiment for determining instantaneous frequency of shaft rotation is the pulse-rate converter described below. However, instantaneous frequency can be determined simply by feeding the pulses to a high-speed counter and resetting it at each pulse. If there were no modulation of the 30 Hz shaft rotation-frequency or variation in intertooth spacing, the time between pulses would be a uniform $1/30$ Hz$\times 1/N$, where N is the number of teeth on the bull gear. Thus, an 80-tooth bull gear produces 2400 pulses per second, with a time of $1/2400$ sec$=417$ microsec between pulses. That figure may be considered a reference elapsed time, from which elapsed time representative of changes in instantaneous frequency reflecting blade resonances will differ by nanoseconds. That difference time can be converted into a signal which is subjected to Fourier Transform analysis to provide resonance information. However, it will be appreciated that a very high-speed counter is needed to obtain useful information. Accordingly, the following circuitry is considered preferable.

Pulse-Rate Converter

The output of sensor interface 32 (see FIG. 3b) is fed to pulse-rate converter 34. The function of converter 34 is to convert the cleaned-up pulses of FIG. 3b to a voltage representative of pulse frequency. The specific pulse-rate converter circuit now described is designed for a system with the following parameters, but the circuitry may readily be adapted to other systems by persons of ordinary skill in designing circuits.

For a typical 80-tooth bull gear and 30 Hz turbine-generator, the pulse repetition rate is $80\times 30=2400$ Hz. The resonant frequencies of interest are from approximately 10 Hz to 150 or 200 Hz. (For the specific steam turbine for whose testing this particular pulse-rate converter circuit was designed, the lowest frequency of interest was 19 Hz and the highest was approximately 150 Hz.) The main modulating frequencies of interest are those due to the lower-frequency excitation modes of the large blades of the turbine. They generally may occur in the range from 60 Hz to 200 Hz; under normal operating conditions, they can modulate the 30 Hz fundamental of the system in the range of $30\pm 0.0005$ Hz. Also of interest are lower-mode turbine-shaft torsional resonant frequencies generally occurring in the range from 10 Hz to 40 Hz.

Figure 5:
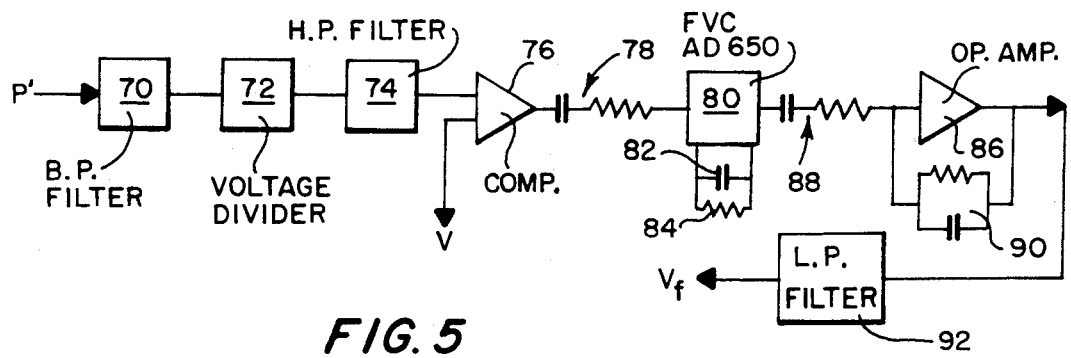
FIG. 5 shows a pulse-converter circuit for use in converting pulses to an analog voltage representative of frequency.

FIG. 5 provides a detail drawing of pulse-rate converter 34 of FIG. 1. The output of sensor interface 32 is fed to the input of converter 34, which processes, integrates, and filters signals representative of occurrences of pulses P and P'. The output of converter 34 is a dc-shifted signal whose amplitude is linearly proportional to pulse frequency, and thus linearly proportional to instantaneous rotation frequency of the turbine shaft. Converter 34 thus provides an output voltage $V_f$, which is proportional to the frequency of pulses P and P'. FIG. 3c shows a voltage $V_i$ representative of an integral of pulses P', and a dotted line a which is a moving-time average of $V_i$, provided by appropriately filtering it to provide filtered output signal $V_f$. The details of this procedure are now described.

Figure 3B:
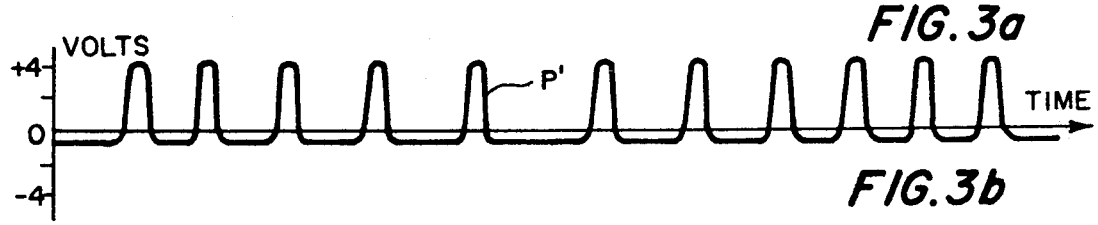
Figure 3C:
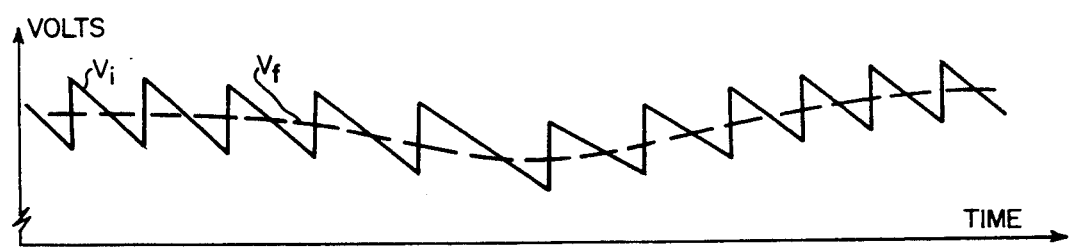

As shown in FIG. 5, cleaned up pulses P' of FIG. 3b are fed to a bandpass filter 70, having a 0.1 Hz to 10 KHz pass band. Filter 70 removes the dc component of the input signal and attenuates high frequencies. The output of filter 70 is fed to voltage divider 72, which further attenuates the signal, for example, by a 1:2 factor.

The signal is then fed to 20 Hz 4-pole high-pass filter 74. The output of filter 74 is fed to an operational amplifier 76, configured as a comparator having a predetermined voltage V (for example, 0.5 v) for threshold/reference adjustment. When a pulse input to operational amplifier/comparator 76 exceeds the threshold/reference voltage level, operational amplifier/comparator 76 changes its output state from 0 to 5 v.

The output of operational amplifier/comparator 76 is delivered to capacitor-resistor combination 78, which removes the dc component and passes higher frequencies. Appropriate values for capacitor-resistor combination 78 are 270 pf and 4.7K.

Capacitor-resistor combination 78 passes a positive spike to a frequency-to-voltage converter (FVC) 80 at the beginning of a pulse P'. FVC 76 is conveniently an Analog Devices AD650 chip. Each time a positive pulse triggers the AD650 chip, it provides a current pulse of predetermined duration and amplitude to an integrating capacitor 82. The AD650 chip ignores negative inputs, so that it does not respond to the negative spike caused by the trailing edge of the pulse output from comparator 76.

Capacitor 82 integrates the current pulses in accordance with the formula $V=(1/C)\times$ Integral i dt$=Q/C$, where C is the value of capacitor 82. The AD650 chip used here as FVC 80 has a calibration resistor 84 connected across capacitor 82. Resistor 84 is used to adjust the output of the AD650 chip to a desired full-scale value. Here it is desired that full-scale voltage be 10 v for a pulse-repetition rate of 2400 per second. A convenient value for resistor 84 is 220K in series with a 50K pot.

The output of FVC 80 is a voltage $V_i$ shown in FIG. 3c, a series of triangle waves whose frequency is the frequency of pulses P and P'. The integrating side of the triangle is very steep, but the leakage or decay side is much less steep, as a result of the time constants associated with charge and discharge of capacitor 82. The height and width increments for the steep side of the triangle are always the same ($V=Q/C$). But the height and width increments of the descending side of the triangle vary in accordance with pulse spacing (or, equivalently, instantaneous pulse frequency), since the descending side is an exponential decay function dependent on how much time elapses until the next current pulse occurs.

The output of FVC 80 is fed to an operational amplifier 86 via a series resistor-capacitor combination 88, which removes dc. Appropriate values for series resistor-capacitor combination 88 are 10K and 1 uf. Operational amplifier 86 has as feedback loop a parallel resistor-capacitor combination 90, 10K and 22 nf, providing unity gain at low frequency and attenuation at higher frequencies. Resistor-capacitor combination 90 thus acts as a prefilter for low-pass filter 92, to which the output of operational amplifier 86 is next fed.

Filter 92 is a 150 Hz 8-pole low-pass filter. The smoothed (averaged) output voltage $V_f$ (shown as a dotted line in FIG. 3c) from filter 92 is then fed to processing unit 36, as described above. The 150 Hz filter was inserted for anti-aliasing purposes before sending the signal to an analog-to-digital converter. The 150 Hz cutoff value was selected to eliminate frequencies above 150 Hz, because they were of little interest in the case of the turbine that this unit was designed to test. If frequencies, for example, of up to 200 Hz were of interest, it would be necessary to raise the cutoff frequency of filter 92 to accommodate them.

Voltage $V_f$ is an analog signal whose instantaneous value is representative of the rate of shaft rotation. The rate is, in the system described above, 30 Hz % small modulations occurring at various frequencies. As stated earlier, the main modulating frequencies of interest for large low-pressure turbine blades is in the range 60 Hz to 150 or 200 Hz, of amplitude approximately ±0.0005 Hz. Shaft torsional resonance modulation of a frequency in the range from 10 Hz to 40 Hz may accompany such blade resonance. The frequencies of interest occur in the presence both of considerable noise and of harmonics of 30 Hz.

As indicated previously, the sensor described above updates the value of instantaneous frequency approximately 2400 times per second (30 Hz×80 teeth). Such signal information is appropriate for detection of signals up to 1200 Hz, based on the Nyquist Theorem. But the time constants of the foregoing demodulation circuit reduce the 1200 Hz figure to an effective 400 Hz to 600 Hz cut-off frequency; that value is nonetheless well in excess of the 60–200 Hz frequencies of interest for large steam-turbine blades. How to adapt the foregoing circuitry to different frequencies of interest is obvious to persons skilled in design of electronic circuits.

Direct use of pulses

As an alternative to providing analog signal $V_f$, pulses P may simply be conditioned and fed to processing unit 36. In this approach, no frequency-to-voltage conversion preprocessing step occurs. However, the pulses may first be conditioned to remove noise. This is done by conventional means.

In either case the pulses or signal $V_f$ must be processed within processing unit 36 to extract from the concommitant noise and harmonics the signals of interest which are induced by modulation of the 30 Hz shaft rotation rate by blade and shaft resonant frequencies.

IV. Processing Unit

The signals provided by the above means are fed to processing unit 36. Processing unit 36 extracts the resonant-frequency signals of interest from noise including shaft rotation-frequency harmonics, as described below in section V. In addition, processing unit 36 analyzes data concerning the resonant-frequency signals of interest in accordance with procedures described below in section VII.

This method is conveniently implemented with an IBM PC-386 personal computer, based on an 80386 microprocessor chip, as a processing unit. However, a one-board microcomputer as a commercial standalone unit, or other microprocessor or microcontroller chips, may be used, instead, depending on design and commercial considerations. The invention is not limited to implementation with any particular processing unit.

Peripherals

Processing unit 36 is optionally connected to a variety of peripheral units. When the invention is used simply to measure resonance information for a component, the peripherals are used just to provide that information. When the invention is used to determine whether changes in resonant vibration characteristics are occurring that indicate prospective failure of a component, the peripherals are used not only to generate reports or provide information, but also to alert operators or control-room personnel by visual and/or auditory means, and also in some applications to shut down the equipment before a failure occurs.

Referring to FIG. 1, shutdown means 38 shuts rotating machine 12 down when processing unit 36 detects an imminent failure, such as a blade or shaft fracture. When processing unit 36 detects such a prospective catastrophic failure condition, by means described below, unit 36 sends a shutdown signal to shutdown means 38. Shutdown means 38 then shuts system 12 down, by stopping power delivery thereto, for example, by shutting off steam delivery to the turbines and/or venting steam therefrom. Preferably, this is accomplished in an orderly manner, following a predetermined shutdown routine. In the case of a device driven by an electric motor, such as the pump of FIG. 2, the shutdown means opens the electrical power input line to the device.

In the present state of the art, it is believed that the management of electric power generation facilities will be unwilling to permit automatic shutdown of steam turbines simply because a computer device indicates that shutdown is appropriate. (That is not necessarily true in other applications of the invention.) Accordingly, it is presently contemplated that a shutdown alarm signal will be provided, and that an engineer will then examine the data on which the alarm signal was generated in order to determine whether he agrees that such data warrant a shutdown. The inventors contemplate that as this invention proves itself in the industry, and as more experience is gained with resonance information indicative of an impending catastrophic failure, it will become acceptable to the industry to operate in an automatic shutdown mode. Accordingly, the invention comprehends both alarm and shutdown modes of operation.

Monitor 40a conveniently displays waveforms, spectrums, and/or historical data, such as as skewness of a resonant frequency around its mean, kurtosis of a resonant frequency about its mean, and formation of secondary resonance peaks (discussed in section VII-B). Such data is provided by processing unit 36. Printer 40b prints data and other information provided by unit 36. Alarm 40c is a visual or auditory adjunct to, or substitute for, shutdown means 38. Keyboard 42 is a convenient means for inputting additional information to unit 38, commanding reports, or otherwise directing task performance. Ports 44 provide unit 36 with additional input and output of information.

Spectrum analyzer implementation

A simplified implementation of the invention dispenses with the elaborate signal-processing procedures described below and with the processing unit that carries them out. Instead, a commercially available, off-the-shelf spectrum analyzer (such as the Zonic A/D 3525 Dual Channel FFT Analyzer) is used to observe the signals described earlier.

This approach provides spectral information of the kind described below, so that at least some of the resonant frequencies of interest can be observed. This approach allows elimination of interference by shaft harmonic frequencies, when synchronous techniques described below (section V-B) are utilized through additional external electronic circuitry. This approach also allows use of "zoom analysis" to obtain high resolution of spectral resonance frequencies of interest. However, this approach does not permit use of the below-described special noise-elimination techniques, trend analysis, and automatic alarm and shutdown expedients. It is therefore not contemplated as a preferred embodiment, but rather just as a convenient portable diagnostic device.

V. Signal Processing

The procedures for signal processing that are involved here may advantageously be illustrated with reference to signals induced by vibration of turbine blades. A typical large-turbine blade rotates at 30 or 60 Hz, and may be 4 feet long, weighing 40 pounds. A single stage of a steam turbine typically comprises 60 to 140 such blades. In normal operation, hydrodynamic forces may deflect the individual blade-tips ±0.001 inches at a principal mean resonant frequency (for example, 78 Hz). The blade thus oscillates slightly at that frequency around its point of attachment to the shaft. As a result there is an alternating positive and negative transfer of angular momentum from the blade to the shaft and thus to the entire rotating system. This alternating plus and minus transfer of momentum modulates the shaft rotation frequency. The amplitude of such modulation is related to the ratio of the blade angular momentum to the angular momentum of the entire rotary system (turbine, generator, etc.).

The frequency of angular rotation of the shaft has a 30 Hz main component, which is modulated, in this example, by an 78 Hz component (among others). The 60 to 140 blades of a stage are very similar in size and shape, and typically have resonant frequencies within a ±2 Hz bandwidth of a mean resonant frequency for the set of blades. Subsets of these blades (for example, 5 to 10) may be mechanically connected to form groups of blades; that has the result of causing such groups to have group resonant vibration characteristics, which the system of this invention also monitors.

FIG. 6 illustrates these effects, based on the inventors' theoretical calculations and their empirical observations discussed below. It is seen that a very small-amplitude 78 Hz sine wave modulates the 30 Hz shaft-rotation frequency. The result is a rotation frequency swing from approximately 29.9998 Hz to 30.0002 Hz. Using a bull-gear encoder of the type previously described involves a 2400 pulse/sec signal. The modulation described places a several nanosecond (for example, 5 nsec) variation in pulse spacing in a pulse train having an approximately 420 microsecond interval between pulses. That is the type of signal that must be extracted from the sensor signals and accompanying noise, to detect these resonant frequencies. Furthermore, to measure small changes in such resonant frequencies involves even smaller signal-to-noise ratios.

A significant amount of interference occurs at harmonics of the fundamental frequency—30 Hz. These interfering modulations, which are much greater in amplitude than the modulations of interest, are unavoidable artifacts of the system. For example, bull gear 28 will typically have variations in the spacing of its N gear teeth. The effect of this repeats every rotation, so that there is an apparent (but nonexistent) rotational speed variation based on 30 Hz and its harmonics. Other imbalances, misalignments, and loads in the rotating system will create variations in shaft rotational rate that repeat for each rotation. (The foregoing statements concerned a machine with a 30 Hz fundamental. A machine having a 60 Hz fundamental has harmonics that are multiples of 60 Hz rather than of 30 Hz.)

The basic tool that the inventors have used to extract signals of interest from the interference found in the sensor signals has been the Fourier Transform. Implementations are described below using both Fast Fourier Transform (FFT) and Discrete Fourier Transform (DFT).

As previously indicated, pulse-rate converter 34 provides a demodulated output voltage signal representative of pulse frequency; alternatively, the pulses are used directly after conditioning them. Whether the pulses are used directly or after frequency-to-voltage conversion by pulse-rate converter 34, the pulses may be subjected to either FFT or DFT analysis and the results may be examined. This approach leads to data such as that shown in FIG. 10, in which there is a great deal of off-scale modulation shown at $n \times 30$ Hz, where $n=1, 2, 3 \ldots$.

Instead and preferably, whether the pulses are used directly or after frequency-to-voltage conversion by pulse-rate converter 34, the pulses are then subjected to a DFT or FFT analysis in which special measures are taken to eliminate harmonic interference. These interference-removal techniques are based on a principle that the FFT or DFT analysis of signals depends on the choice of frequency points at which shaft-rotation frequency amplitudes are observed. A typical FFT or DFT analysis ascertains frequency amplitudes at a given number of spectral frequencies, such as 512 or 1024 spectral frequencies, which are spaced from one another by predetermined frequency intervals. The selected spectral frequencies are sometimes referred to as "spectral bins," but it should be understood that a Fourier Transform spectrum analyzer provides signals representative of amplitude and phase at a series of predetermined discrete data points, such as exactly 30 Hz, rather than amplitudes and phases associated with some range such as 30 Hz±0.001 Hz.

When a signal of particular frequency interferes with observation of a frequency of interest, it is important whether the interfering frequency coincides with one of the predetermined FFT or DFT spectral frequencies. For example, in this case 30 Hz is an interfering frequency. If there is a spectral frequency of exactly 30 Hz in the DFT or FFT, all of the 30 Hz signal will be registered at that location. But if spectral frequencies occur instead at other values, such as 29.5 Hz and 30.5 Hz rather than 30 Hz, the 30 Hz interference signal will "leak" or be smeared over or among many adjacent spectral bins along the frequency axis. The amplitude of the leakage diminishes as a function of frequency difference from the interfering frequency value (here, 30 Hz). Such smearing is particularly evident at the lower power levels that characterize the shaft-rotation-modulating frequencies of interest here.

An important element of the techniques used in this invention (described below) is therefore that, to eliminate the foregoing interference, the Fourier Transform spectral frequencies must be made to coincide with the dominant interfering frequencies. Here, that is the 30 Hz shaft rotation frequency being modulated and its harmonics (such as 60, 90, 120, and 150 Hz).

A first technique for removing harmonic interference, used with DFT analysis is described (Section A, below). Then such techniques for use with FFT analysis are described (Section B, below). Direct analysis of the encoder pulse train, without frequency-to-voltage conversion, is next described (section C, below). An extremely effective technique for removing other sources of interference is last described (Section D, below).

A. Interference Reduction - DFT Technique Using F/V Converter

Converter 34 provides a voltage whose amplitude is proportional to instantaneous frequency. The voltage is then converted to a digital signal by a conventional analog-to-digital converter (ADC) that is clocked with pulses P'. Pulses P' are used to clock the ADC in order to permit the length of the data record that the ADC uses for analog-to-digital conversion to be set at an integral multiple of N, where N is the number of teeth on the bull gear and thus the number of pulses occuring per complete shaft rotation. The data is acquired from M shaft rotations for the DFT analysis, so that the data record length is N×M. (For example, for a 120-tooth bull gear, and a value of M=100, number of pulses in data record=N×M=12,000. That means that the data record contains data for 100 complete shaft rotations. That is 3.33 sec.)

Since pulses P' are at approximately 2400 Hz, the ADC is sampled at a much higher rate than necessary to satisfy the requirements of the Nyquist Theorem. Here, the highest frequency of interest is approximately 200 Hz. Hence, a sample rate of 600 Hz is more than adequate. Accordingly, the inventors prefer to feed pulses P' to a conventional divide-by-4 circuit before using the pulse train to clock the ADC. That permits use of less computational resources.

The data record is then subjected to a DFT analysis. Because the user is free to set the data record to be N×M pulses long for DFT analysis, these bins will necessarily include 30 Hz, 60 Hz, 90 Hz . . . . That occurs because, in a Fourier Transform, the lowest spectral frequency corresponds to one complete cycle with a period equal to the time for N×M sensor pulses. Therefore, a data record from N×M sensor pulses contains data from M complete shaft rotations. Thus, the 30 Hz fundamental frequency is found at the Mth spectral frequency, the next harmonic (60 Hz) is found in the 2Mth spectral frequency, the next harmonic (90 Hz) is at the 3Mth spectral frequency . . . and the last harmonsic registered is at spectral frequency N×M/2. Thus, if a data record contains 10 data segments, and N=120, 30 Hz will be at the 10th spectral frequency, 60 Hz at the 20th, 90 Hz at the 30th, . . . and 1800 Hz at the 600th spectral frequency. (These counts omit the zero spectral frequency.)

The result of the foregoing procedure is to identify a series of spectral lines, as shown in FIG. 7. A moderate peak is shown at 78 Hz, the resonant frequency of the turbine blades for this example. Higher peaks are shown at 30, 60, 90, 120, and 150 Hz. These represent the 30 Hz fundamental of the system and its harmonics. Shown as a dotted line I in FIG. 7 is a representation of the leakage (interference) that would occur at each of the shaft-rate harmonic frequencies if spectral frequences did not coincide with 30 and its multiples.

The peak at 78 Hz is not a line at a single spectral frequency, as the harmonics are, for several reasons. First, blade resonance is not at a frequency in step with shaft rotation, as the harmonics are. Hence, the foregoing procedure cannot confine the signal to one spectral frequency. Second, there is not a single blade fundamental resonant frequency, but rather a different fundamental resonant frequency for each of 60 to 100 blades for a turbine stage. These are distributed around a mean fundamental resonant frequency, for example, 78 Hz±2 Hz.

B. Interference Reduction - FFT Technique Using F/V Converter

The FFT, unlike the DFT, does not permit an arbitrary selection of the number of points in a data record. The number must be a power of 2, such as 512 or 1024 (which are two convenient values). To achieve a hulling effect similar to that described in the preceding section, the data record must have two characteristics First, the data record must include a number of shaft rotations equal to an integral power of two; second, the number of data points read per shaft rotation (i.e., number of data points in each data segment) must be also be an integral power of two.

Converter 34 provides a voltage $V_f$ whose amplitude is proportional to instantaneous frequency. Over an interval of 1/30 sec, one complete shaft rotation occurs. That interval (data segment) can be divided up for ADC purposes in any predetermined way; the number of intervals within the data segment does not have to be the same as the number of pulses from which $V_f$ was originally derived. At every moment, there is available at the output of converter 34 an analog voltage $V_f$ that is representative of the value of instantaneous shaft-rotation frequency at that time. Every moment is a possible data point. Accordingly, the processing unit can direct the ADC to read (sample) the analog voltage Vf at whatever intervals or data points are desired.

Thus, the number of data points at which $V_f$ is read during each 1/30 sec interval (data segment) can be 128, 256, or any other convenient number. (However, the number should be at least high enough to meet the Nyquist criterion that sampling rate must be at least twice the highest frequency of interest.)

Here, we assume a 100-tooth bull gear, producing 100 sensor pulses per shaft rotation. A number of data points per shaft rotation equal to a power of two—in this example, 128—is provided by means next described. Accordingly, every data segment containing data from N pulses (here, 100 pulses), comprising data from one complete shaft rotation, shall be divided into a number of points at which $V_f$ is read. The number is to be an integral power of 2, such as 128. Thus the frequency-to-voltage converter output from 100 sensor pulses provides a varying $V_f$ value over a 1/30 sec interval. The value of $V_f$ is sampled 128 times for analog-to-digital conversion, because the ADC clock is enabled 128 times during the interval in which 100 sensor pulses occur.

The 128 clock pulses for every 100 sensor pulses are provided as follows. First N pulses P' are fed to a conventional computer-controlled phase-lock-loop pulse multiplier-and-divider circuit. (That circuit is conveniently implemented with a Motorola MC14046B chip, which contains a phase comparator and voltage-controlled oscillator (VCO).) The N pulses provide an approximately 1/30 sec interval representative of one complete rotation of the shaft.

The N sensor pulses are fed to one input of the phase comparator circuit of the chip. The VCO output is fed back to another input of the phase comparator circuit, via a divide-by-n counter. Dividing by n in the feedback loop has the result of making the main circuit multiply by n, so that the output is a pulse train of n times the input frequency. Here n is to be 128. The pulse train is then divided by N, so that the final output pulse train has 128 pulses during every complete 360°-rotation of the shaft. (It would have been equally feasible to obtain 128 pulses per shaft rotation by multiplying by 32 and dividing by 25, since N, here 100, is $25 \times 2^2$. Thus, the procedure may be generalized in terms of multiplying by a first factor and dividing by a second factor, where the first and second factors have a relationship such that the final result is an integral power of two. The second factor is N divided by the highest power-of-two factor in N; the first factor is the quotient of the desired power of two divided by the foregoing highest power-of-two factor of N.)

Thus, the result is a pulse train of 128 clock pulses during an interval (data segment) in which the sensor produces 100 data pulses. These 128 pulses are then used to clock the analog-to-digital converter converting $V_f$ to digital format.

The data segments are then accumulated for a number of shaft rotations equal to an additional power of two (for example, 8 or 16), so that the resulting data record contains a number of data points equal to an integral power of two. The data record is then subjected to FFT analysis. The result is a spectrum similar to that provided by DFT analysis, as described previously, and illustrated in FIG. 7.

C. Direct Use of Pulses: Spectral Analysis Independent Time Sampling

The foregoing procedure used as the voltage input for ADC the analog output $V_f$ from converter 34. Pulses P' can instead be digitized directly after having been passed through a low-pass, anti-aliasing filter having a cutoff frequency set at less than half the sample rate. The digital sampling rate is controlled by the internal clock of a computer. The data record is then subjected to a DFT or FFT analysis. The result of the foregoing procedure is to identify a series of spectral lines centering around $f_c$, where that is the pulse rate per second (for example, approximately 2400 for a bull gear encoder of 80 teeth). That center-frequency $f_c$ is modulated by other frequencies. The principal spectral line is at $f_c$, which is flanked by principal sidebands at frequencies $f_c \pm 30$, $f_c \pm 60$, $f_c \pm 90$, etc. These are the 30 Hz fundamental and its harmonics, as above. In addition, there are two smaller sidebands of $f_c \pm 78$, representing the resonant frequency of interest.

Synchronous Pulse-Controlled Time Sampling

Elimination of interference by the shaft harmonic frequencies, when direct pulse analysis is performed, can be accomplished by using a modified form of the techniques described in section A and B, above. The interference lines can be made to fall exactly on spectral frequencies by using the pulses to control the analog-to-digital converter. The result is a spectrum illustrated in FIG. 8. The harmonic interference lines appear at the center frequency (for example, 2400 Hz)±multiples of 30 Hz. The modulating frequencies of interest $f_m$ (for example, 78 Hz) appear at the center frequency$\pm f_m$. In the present example, the lowest frequency of interest is 19 Hz, the shaft torsional-vibration fundamental resonant frequency (not shown in FIG. 8). As in FIG. 7, the harmonics are lines confined to single spectral frequencies but the frequencies of interest are not (for the reasons previously stated).

The encoder pulses used to control the clock of the analog-to-digital converter must first be processed to provide a further pulse train satisfying Nyquist Theorem requirements and avoiding aliasing. That is done by multiplying the pulse repetition rate by at least 3. In addition, the pulse spacings must not be modulated at frequencies greater than that of the lowest modulating frequency of interest (in this example, 19 Hz). If such modulation of clock spacings occurs, the spacings of the clock pulse signal will be in step with those of the encoder pulse signal to be digitized. That will tend to null out the modulation information sought to be detected by the signal processing. Hence, the clock signal must be passed through a low-pass filter with appropriate cutoff frequency. It is considered that 10 Hz is sufficiently below 19 Hz for purposes of this constraint. Therefore, the low-pass filter should have a 10 Hz cutoff frequency.

The foregoing clocking scheme is effectuated by feeding the pulse train to a phase-lock-loop voltage-controlled oscillator pulse-multiplier circuit similar to that previously described, using the same Motorola MC14046B chip. Here, the pulse train is fed to one input port of the multiplier (which is one input of a phase comparator). The output of the comparator is fed to a 10 Hz low-pass filter. The filter output is fed to the VCO unit of the chip. The output of the VCO is fed to a conventional divide-by-3 circuit, and the resulting output is fed to the other input port of the comparator. (As previously indicated, 3 was selected as the multiplier factor to satisfy the requirement of the Nyquist Theorem of at least 2 samples per pulse.) The result of the feedback is to make the VCO operate at 7200 Hz, so that its output when divided by 3 and fed to one input port of the phase comparator will approximate the 2400 Hz pulse input fed to the other input port. The 7200 Hz pulse train is used to clock the analog-to-digital converter. This 7200 Hz pulse train has pulse spacings based on the average of the last 0.1 sec of input pulses, due to the 10 Hz low-pass filter. That 0.1 sec interval represents 240 pulses, or 3 complete shaft rotations. Pulse spacing modulations at frequencies greater than 10 Hz do not appear in the clock signal, because of the 10 Hz low-pass filtering.

The resulting pulse train is then used to clock an analog-to-digital converter, which receives as analog signal input the same pulse train that was fed to the Motorola MC14046B chip. However, that pulse train should first be passed through an anti-aliasing filter before being used as an ADC analog signal input. The anti-aliasing aliasing filter is a low-pass filter whose cutoff frequency meets two constraints: (1) it must be less than half the sampling rate; (2) it must exceed the highest sideband of interest. If these constraints are not satisfied, some information can be lost.

Here the fundamental pulse train frequency is 7200 Hz. Half that is 3600 Hz. The highest sideband of interest is at 2400 hz+150 to 200 Hz. Thus 2800 Hz is an appropriate value for the cut-off frequency of the anti-aliasing low-pass filter. (It is also seen that multiplying 2400 by 3 in the Motorola MC14046B chip, rather than just by 2, was useful because it avoided losing the upper sidebands.)

The ADC output is a series of digital signals representative of instantaneous shaft rotation frequency. These signals are then subjected to the above-described procedures (sections A and B), in the same manner as was the output of the frequency-to-voltage converter 34, to remove interference at harmonics of shaft rotation frequency while providing a DFT or FFT spectrum. (This requires, for example, making the length of the data record exactly an integral number of shaft rotations.)

D. Direct Use of Pulses: Real Part of $G(\omega',\omega_o)$ Technique

The inventors have found particularly advantageous an interference-rejection technique for direct analysis of pulses. This technique differs from the DFT and FFT techniques described above in that it additionally rejects interference originating from amplitude variations in pulses as well as interference from other sources of background noise. Hence, this new procedure is effective to reject general interference from sources that do not modulate the shaft-rotation frequency but nonetheless contaminate the modulation signal. As stated above, this procedure also rejects interference due to pulse amplitude modulation.

As a first step, the DFT or FFT procedure of preceding section C is carried out using pulses P' directly. The result is an array of complex numbers $F_i(\omega)$, which are determined for each spectral frequency of the DFT or FFT, where $\omega$ (omega) is angular frequency in radians/sec for the particular spectral frequency. The procedure is carried out M times, where M is an integer representing the number of data records taken. Here, I is the ith data record in the range from 1 to M. For the kth spectral frequency, the value of $\omega$ is $kd\omega$, where $d\omega$ is the interval between adjacent predetermined spectral frequencies and equals 1 divided by the period of the data segment in seconds.

For purposes of this analysis, a function $G(\omega',\omega_o)$ is defined as follows:

$$G(\omega',\omega_0) = \frac{-\sum_{i=1}^{M} F_i^2(\omega_0)^* F_i(\omega_0 + \omega') F_i(\omega_0 - \omega')}{\sum_{i=1}^{M} |F_i(\omega_0)|^2}$$

In this expression, $\omega_o$ is spectral frequency in the Fourier Transform that is the one closest (nearest) to the pulse repetition rate of the encoder, in radians per second. That rate will be some integral multiple of shaft rotation-frequency, such as 80 times it. $F_i(\omega_o)$ is a complex number representing the amplitude and phase of the Fourier Transform function for the spectral frequency nearest to $\omega_o$ (unless $\omega_o$ is made to coincide with a spectral frequency, in which case $\omega_o$ is that spectral frequency). $F_i(\omega_o+\omega')$ and $F_i(\omega_o-\omega')$ are complex numbers representing the amplitude and phase of the Fourier Transform function for spectral frequencies equally spaced from the spectral frequency nearest to $\omega_o$, where $\omega'$ is any value $kd\omega$, where k is an integer and $d\omega$ is the frequency interval between adjacent spectral frequencies. $F_i^2(\omega_o)^*$ is the complex conjugate of the square of $F_i(\omega_o)$.

In utilizing this function, $G(\omega',\omega_o)$ is determined for every value of $\omega'$ that could define a frequency of interest. For example, where $\omega_o$ is 2400 Hz and spectral frequency interval is 0.1 Hz, $G(\omega',\omega_o)$ might be determined for the 2000 values of $\omega'$ from 0 to 200 Hz, covering the range of possible sidebands from 2200 Hz to 2600 Hz.

The function $G(\omega',\omega_o)$ has useful properties for purposes of this signal processing procedure. For values of $\omega'$ representative of frequency modulation of $\omega$, the value of the real part of $G(\omega',\omega_o)$ is a large positive spike. For values of $\omega'$ representative of amplitude modulation of $\omega_o$, the value of the real part of $G(\omega',\omega_o)$ is a large negative spike. For other values of $\omega'$, such as those representative of noise components, the value of the real part of $G(\omega',\omega_o)$ is a small, random number. Thus, the modulation signals of interest can be identified and separated from noise signals on the basis of their sign ($\pm$) and magnitude.

How this occurs is now summarized. Each of the complex numbers of the spectrum may be represented in the form $$F_i(\omega) = A_i(\omega) e^{j\Phi_i(\omega)},$$

where $A_i(\omega)$ represents the amplitude of the complex number, $\Phi_i(\omega)$ represents the phase of the complex number, and j is the square root of $-1$. Thus, the product term $F_i(\omega_o+\omega') F_i(\omega_o-\omega')$ in function G can be rewritten as $$A_i(\omega_0+\omega') A_i(\omega_0-\omega') e^{j\Phi_i(\omega_0-\omega')}.$$

It is well known to persons skilled in this field that the sideband phases about a carrier $\omega_o$ for a modulating frequency $\omega'$ may be represented as follows:

$$\phi(\omega_0 - \omega') + \phi(\omega_0 + \omega') = 2\phi(\omega_0) + \pi \text{ for FM about } \omega_0;$$
$$= 2\phi(\omega_0) \text{ for AM about } \omega_0; \text{ and}$$
$$= \text{random number for noise;}$$

where $\Phi(\omega_o)$ is the phase of the carrier.

The remaining product term in the numerator of function G, $F_i^2(\omega_o)^*$, can be rewritten as:

$$A_i^2(\omega_0) e^{-j1\Phi_i(\omega_0)}.$$

Therefore, when $(\omega_o-\omega')$ and $(\omega_o+\omega')$ are FM sidebands, the function G simplifies to the following expression, because the other terms add up to zero:

$$G(\omega',\omega_0) = \frac{-\sum_{i=1}^{M} A_i^2(\omega_0) A_i(\omega_0 + \omega') A_i(\omega_0 \omega') e^{j\pi}}{\sum_{i=1}^{M} A_i(\omega_0)^2}$$

The numerator of this expression G is a sum of scalars (real numbers), since the imaginary part of the complex numbers has cancelled out. If the magnitude of the amplitude of the Fourier Transform value for carrier $\omega_o$ is considered B, and the magnitude of the amplitude of each sideband is considered C, the foregoing sum is approximately $MB^2C^2$. The denominator of the expression is also a real number, $MB^2$. Hence, the value of the whole function $G(\omega',\omega_o)$ is $C^2$, in the case of $\omega'$ being associated with frequency modulation.

It may be shown, similarly, that when $\omega'$ is associated with amplitude modulation, the value of the expression $G(\omega',\omega_o)$ is a real number of opposite sign from the expression for FM signals.

Finally, in the case of any $\omega'$ not associated with frequency or amplitude modulation of the carrier, the value of the expression G is a sum of random complex numbers, which as M becomes larger tend to cancel each other out to provide a near-zero sum.

The above-described property of the function $G(\omega',\omega_o)$ is utilized in this invention to distinguish true FM sidebands of interest from AM sidebands, noise, and like interference.

For purposes of this invention, $G(\omega',\omega_o)$ is to be monitored for values of $\omega'$ in the resonant frequency range of interest, that is, frequencies modulating the rotation frequency of the machine's shaft. Such frequencies, as previously indicated, fall in the range of 10 Hz to 200 Hz for the steam turbines described.

FIG. 11 shows a plot of the real part of $G(\omega',\omega_o)$, for $\omega'=78$ Hz, where 78 Hz is a resonant frequency of a turbine blade modulating a shaft-rotation frequency, and also for a value $\omega'=\omega_{AM}$, where the latter originates from an amplitude modulation signal. (The low-level noise around the X-axis represents the sums for values of $\omega'$ producing random-walk vector sums.) It will be noted that $ReG(\omega',\omega_o)$ is of opposite sign for frequency modulation and amplitude modulation. That property provides a way to distinguish signals originating from AM-modulation from the modulating sources of interest (and thus to reject AM). The plot of FIG. 11 is the result of doing the $G(\omega',\omega_o)$ procedure for every possible $\omega'$ of interest in the Fourier spectrum, and then plotting the value of the resulting real parts of $G(\omega',\omega_o)$ as ordinates and the corresponding values of $\omega'$ as abscissas.

It is thus seen that a hardware or software implementation for processing these signals in accordance with the foregoing procedure will provide an enhanced presentation of values of resonant frequency for a turbine blade or similar equipment. The inventors therefore consider this a preferred embodiment of the invention, although as previously explained the invention works with the other, less complex implementations previously described.

Figure 12:
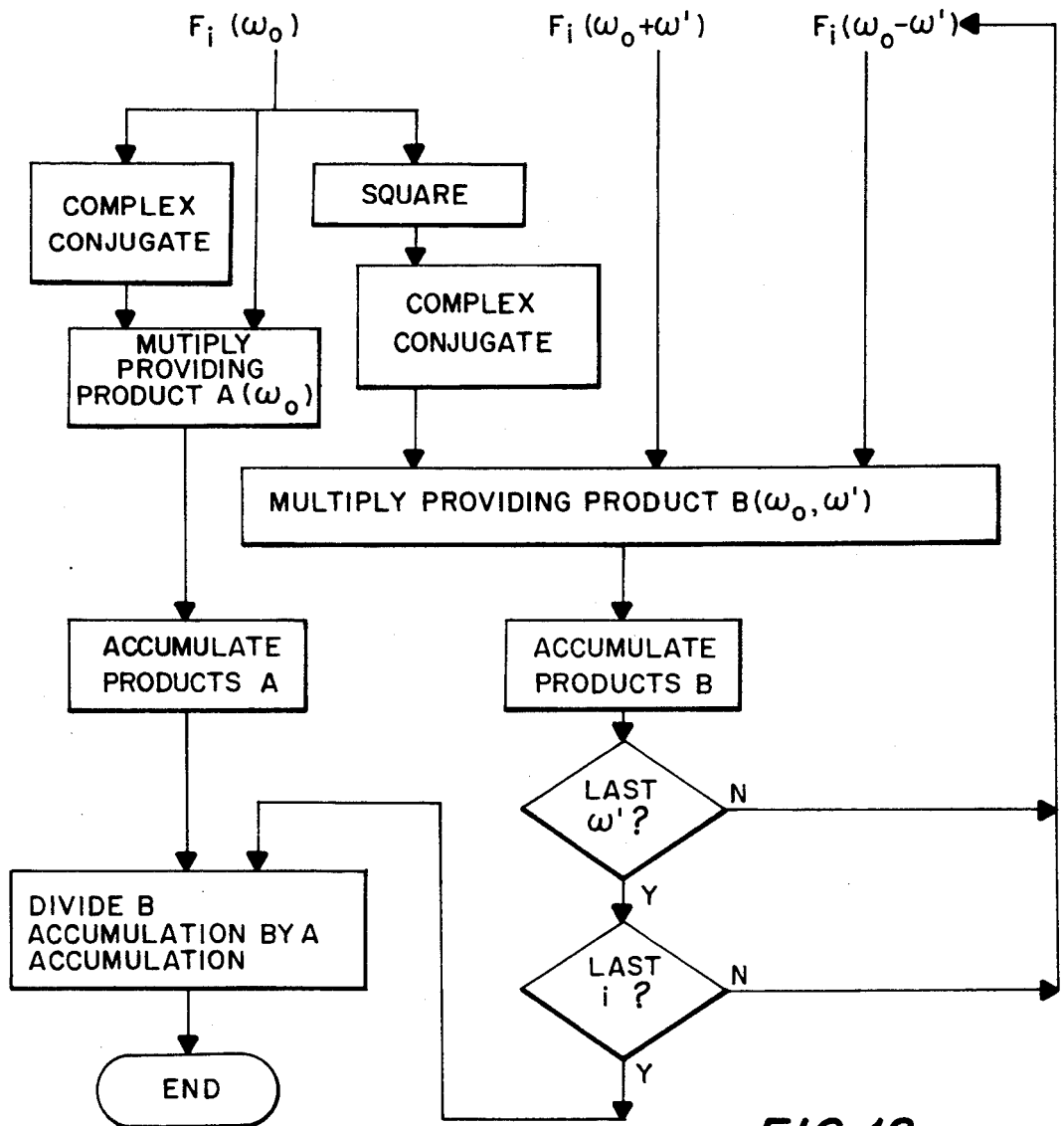
FIG. 12 is a flowchart for carrying out the real part of $G(w',w_o)$ technique.

FIG. 12 shows a flowchart for implementation of the real part of $G(\omega',\omega_o)$ procedure for processing DFT and FFT spectrums to measure resonant frequencies of rotating equipment. The values of $F_i(\omega_o)$, $F_i(\omega_o+\omega')$ and $F_i(\omega_o-\omega')$ are derived from the Fourier Transform analysis of a given data record. First, data is taken from the first data record. The, values of $F_i(\omega_o)$, $F_i(\omega_o+\omega')$, and $F_i(\omega_o-\omega')$ are read for values of $\omega_o$ and the first $\omega'$ under examination.

The complex conjugate of $F_i(\omega_o)$ is taken and multiplied by $F_i(\omega_o)$, providing the absolute value of $[F_i(\omega_o)]^2$. $F_i(\omega_o)$ is squared and the complex conjugate of the square is taken, to provide an input for multiplication. Two other multiplier terms, $F_i(\omega_o+\omega')$ and $F_i(\omega_o-\omega')$, provide inputs and the terms are multiplied as indicated. The results are stored in memory locations, for accumulation as $B(\omega_o,\omega')$ and $A(\omega_o)$.

The foregoing procedure is then repeated for the next $\omega'$ under examination, and so until it has been carried out for the last $\omega'$, providing a set of values in a set of memory locations.

Then data is taken from the second data record. The foregoing procedure is repeated. The values of each $\omega'$ are summed with the values for the corresponding $\omega'$ already in memory for accumulation.

The operations and accumulation is repeated until the last data record has been processed, so that M data records have been processed. Finally, $B(\omega_o,\omega')$ is divided by $A(\omega_o)$ to provide $G(\omega',\omega_o)$. The values of $G(\omega',\omega_o)$ for each $\omega'$ are plotted and/or compared with a threshold value. As previously indicated, the values of $\omega'$ of interest are large real numbers and the "spurious" $\omega'$ values are small, complex numbers.

If the synchronous time-sampling technique is used in analog-to-digital conversion, it can be shown that the numerator of the function G can be decomposed and G can be rewritten as follows:

$$G'(\omega',\omega 0) = \frac{(-1/M)\sum_{i=1}^{M} F_i^2(\omega_0)^* \cdot \sum_{i=1}^{M} F_i(\omega_0+\omega')F_i(\omega_0-\omega')}{\sum_{i=1}^{M}|F_i(\omega_0)|^2}$$

Further, an alternative, simplified form of this expression can be used for detection of modulation, using the following formula:

$$G''(\omega',\omega_0) = \sum_{i=1}^{M} F_i(\omega_0+\omega')F_i(\omega_0-\omega')$$

This form is simpler computationally, but amplitude modulations and frequency modulations do not appear simply as positive or negative peaks. The phases of these peaks must be analyzed to distinguish them.

A generalization of the foregoing procedure is to incorporate the frequency and phase characteristics originating from the modulation process into signal-processing procedures that emphasize the amplitude of the signals of interest and deemphasize the amplitude of noise signals (signals not of interest). It is considered that the foregoing real part of $G(w',w_o)$ procedure is exemplary of a class of such procedures.

The result of any of these procedures is to optimize the signal for rejection of interference. That permits the remaining spectral peaks to be identified and analyzed in detail for their sources and for changes in characteristics relating to physical conditions in the system.

VI. Actual Test Data

Figure 10:
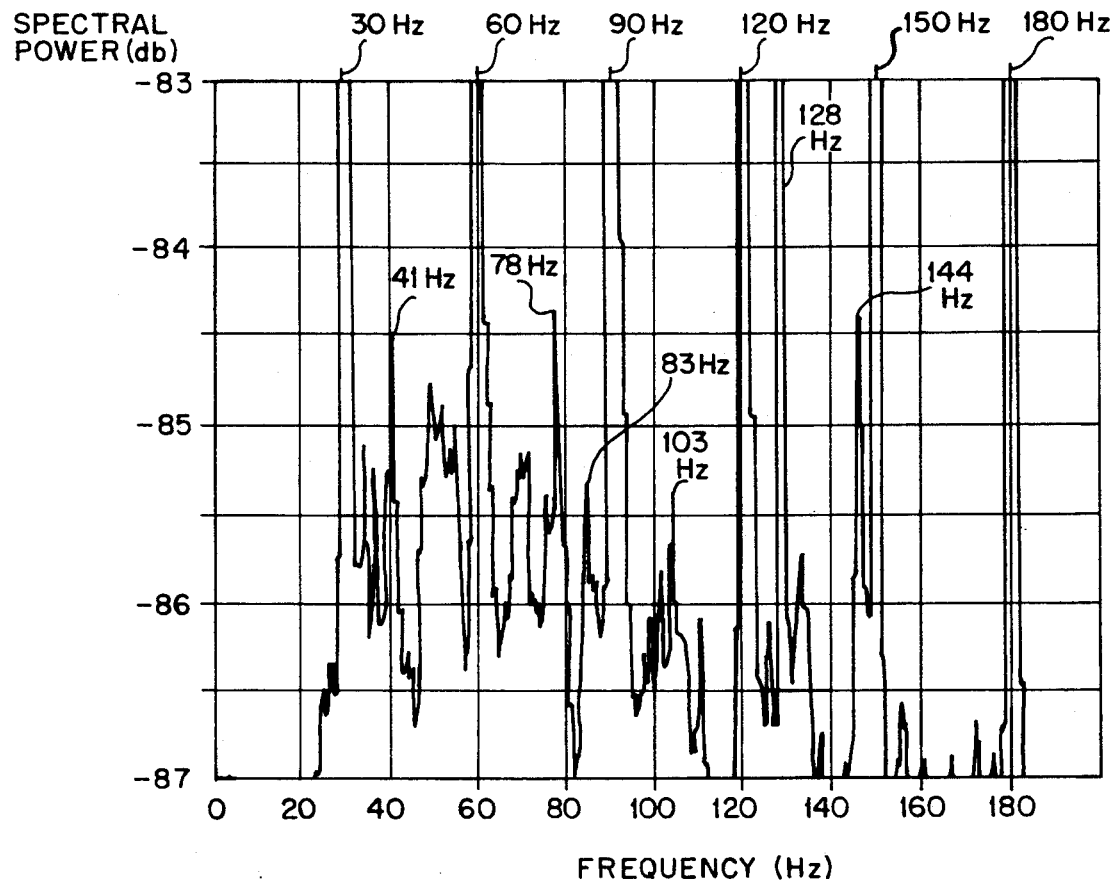
FIG. 10 is a plot of resonant frequency data actually observed for a low-pressure steam turbine at an electric power plant.

Tests using the invention were carried out on an operating turbine-generator set at an electric power generation plant. A plot of the spectra derived from the test is shown in FIG. 10, illustrating spectral amplitudes for spectral frequencies from 0 to 200 Hz and power relative to a 1 v signal amplitude in the −83 db to −87 db range. The empirical data were then compared with data provided by the turbine manufacturer, based on its own measurements of its turbine blade resonances. As described below, the measured data utilizing the invention agree closely with the manufacturer's data. (All of the following data are rounded off to the nearest integer.)

Referring to FIG. 10, it is seen that the 30 Hz interference harmonics go off scale. The bandwidth of the 30 Hz harmonics is caused by FFT leakage, which results from the fact that 30 Hz and its multiples do not fall exactly on spectral frequencies in the signal-processing procedures that were used with this data. This chart thus illustrates the kind of noise and interference signals observed when the invention is practiced without the signal-processing refinements described in previous section V, which the inventors had not yet implemented at the time of their collection of the data shown in FIG. 10. In this data set, no frequency of interest was in the vicinity of a 30 Hz shaft-rotation harmonic. However, in other data sets, a frequency of interest might be near a 30 Hz harmonic and thus its detection would be hindered; this could occur, for example, if a mean resonant frequency migrated in the direction of a 30 Hz shaft-rotation harmonic, whose energy might then reinforce the resonance. That situation would be one in which detection of the migrant frequency would be particularly important, for reasons discussed below in section VII. The inventors therefore consider it very important to utilize the signal-processing refinements described in previous section V.

Referring again to FIG. 10, a peak was detected at 78 Hz. The turbine manufacturer reported that 78 Hz was the fundamental mode blade resonance for the L-0 stage of this turbine. A second peak was detected at 83 Hz in FIG. 10; the manufacturer reported that 83 Hz was the fundamental mode blade resonance for the L-1 stage of this turbine. A third peak was detected at 103 Hz in FIG. 10; the manufacturer reported that 103 Hz was a higher mode blade resonance for the L-0 stage of this turbine. A fourth peak was detected at 144 Hz in FIG. 10; the manufacturer reported that 145 Hz was an additional blade resonance for this turbine (stage and mode not identified).

In addition, peaks at 41 Hz and 128 Hz are shown in FIG. 10; the manufacturer did not identify these. However, it is believed that these are other shaft or blade frequencies that the manufacturer did not identify to the inventors.

In addition, the system of the invention identified a 19 Hz peak (not shown in FIG. 10), which corresponds to the 19 Hz fundamental torsional resonant mode of the shaft.

It should be noted that the preceding discussion, and the data measured and shown in FIG. 10, involved an 1800 rpm 4-pole machine, with 30 Hz rotation. A 3600 rpm 2-pole machine will have 60 Hz rotation, so that all harmonic-interference frequencies will be scaled up. Also, all discussion has been in terms of the 60 Hz standard used in the United States. In foreign countries using another standard, such as 50 Hz, appropriate correction must be made regarding harmonic interference.

VII. Application of System to Defect Detection

As a turbine blade ages, the corrosive environment in which it operates tends to corrode and induce cracks in the blade. The effect of such cracking is to decrease the resonant frequency (or a resonant frequency) of the blade. Another effect that occurs is stiffening of the blade, which increases resonant frequencies. That can place a blade resonant frequency near a shaft harmonic excitation frequency (for example, 90 Hz). That in turn can cause a large-amplitude oscillation leading to metal fatigue and cracking.

Turbine blades are designed and tuned to have resonant frequencies that are not a multiple of 30 Hz. The reason is to avoid having harmonics of the rotating system induce vibration, stress, and failure of the blade. However, when a blade ages and/or cracks, or possesses or develops secondary resonant modes, its resonant frequencies can approach a multiple of 30 Hz. In that event, the system harmonics would reinforce the resonance, thus increasing the amplitude of blade resonant vibration, and catastrophic failure can result. Similar destructive phenomena can occur with shafts, such as the shaft of the pump of FIG. 2, as well as with other rotating components of rotary machines.

When a single blade of a turbine begins to crack, two effects on the spectra of FIGS. 6 to 8 occur. First, the magnitude of the modulation of the 30 Hz shaft-rotation frequency by 78 Hz (or any other modulating resonant frequency) decreases, because the particular blade that is cracking stops contributing angular momentum at the oscillation frequency of the remaining blades. Second, a new modulation occurs at a lower frequency than 78 Hz, as a result of the activity of the damaged blade, which now has a lower resonant frequency. (Blade stiffening causes an opposite effect, in which resonant frequency increases.)

Figure 9A:
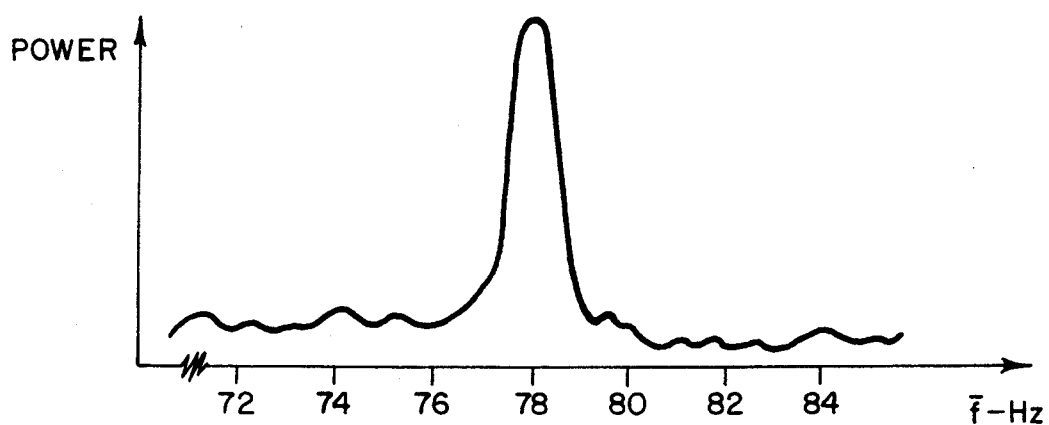
FIG. 9a is a curve showing a set of resonant frequencies for new turbine blades, centering around 78 Hz.
Figure 9B:
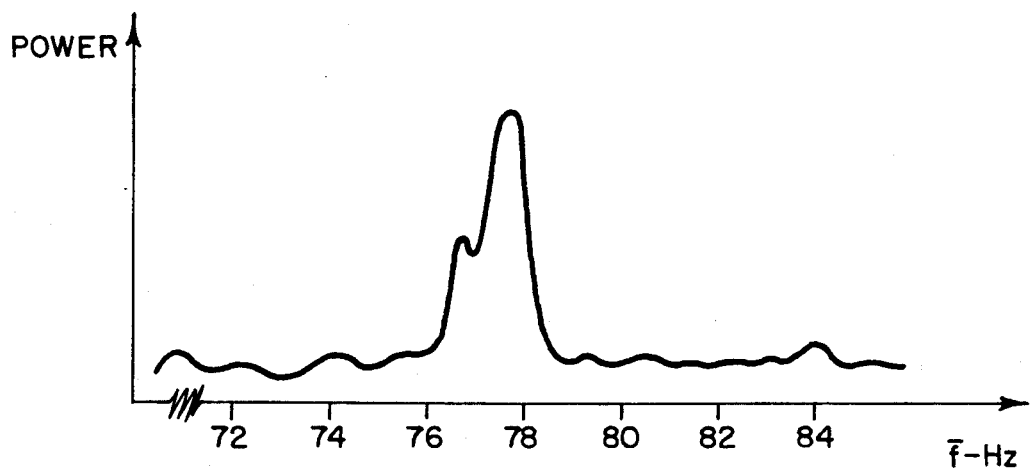
FIG. 9b shows the hypothetical result of some corrosion of the blades and some cracking in a subset of the blades, resulting in both some decrease in all resonant frequencies and a greater shift for the subset, resulting in a shoulder forming on the curve.

FIG. 9a illustrates the total frequency contributions from a complete set of a new L-0 stage turbine. The resonant frequency centers on 78 Hz. FIG. 9b shows the anticipated effect of age on some of the blades. A subset of one or more blades develops some cracking and some further decrease of resonant frequency. Hence the amplitude of modulation at 78 Hz decreases and a secondary peak (shoulder s of FIG. 9b) slightly below 78 Hz develops. In addition, many of the blades corrode, tending to move the composite curve below 78 Hz. (Stiffening would cause the frequency contributions of the stiffened blades to migrate above 80 Hz.)

Figure 9C:
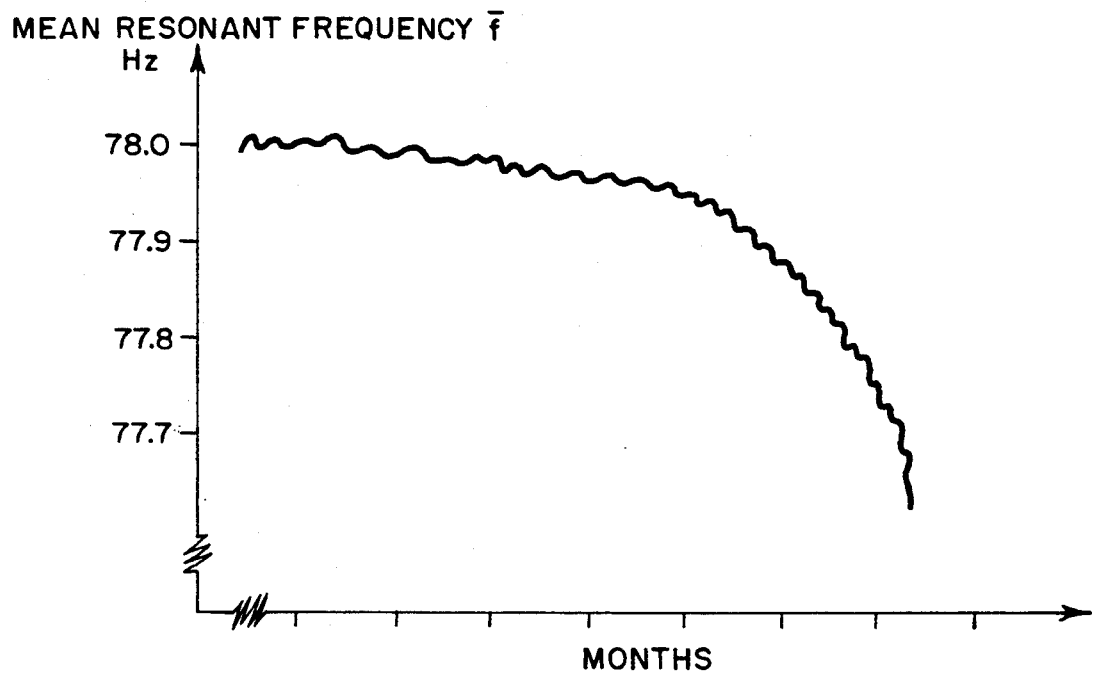
FIG. 9c is a curve showing hypothetical progressive decrease in mean resonant frequency for a single resonant mode of a turbine stage.

FIG. 9c illustrates the events of FIG. 9a-9b as a function of time. In this example, the turbine-blade resonant frequency slowly shifts downward. At a certain time, blade deterioration begins to become more severe and frequency declines more rapidly. This is indicative that a catastrophic blade failure may soon occur.

The foregoing suggests two points that should be made about use of the invention in anticipating component failure in rotating machines. First, various judgment factors enter into making a decision whether an "alarm" condition exists that justifies shutting a machine down for repair. Second, resonance information other than simply mean resonant frequency may be relevant to making such decisions.

A. Judgment Factors

Cracking is a progressive process. At first, a crack is very small and does not impair turbine operation; also, the effect of the crack on resonant frequency of the affected blade may be undetectable at first. The crack slowly increases in size, at an increasing rate, accompanied by progressively decreasing resonant frequency of the blade. Eventually, the crack is large enough to cause the cracked blade to fracture. (In many cases blade stiffening and a consequent increase of resonant frequency may precede and cause cracking.)

Substantial field data is needed to make a decision on what amount of change in resonant frequency should be considered serious enough to warrant shutting a turbine down to replace a deteriorating blade before it shatters. The earlier the shutdown decision is made, the more downtime per year there is and the more blade replacement occurs. The later the shutdown decision is made, the greater the risk of catastrophic failure resulting in a more expensive repair. A further relevant factor is that early warning of impending blade failures permits a replacement to be ordered in advance, so that downtime while a blade in on order is lessened. (It is often expensive and infeasible to inventory replacement blades for steam turbines, because they are individually expensive and are different from unit to unit.)

It is thus a matter of business, experience, engineering judgment, and empirical data what criteria to establish for shutdown and repair. The instant invention does not of itself provide a method of making that judgment. Rather, the invention provides mechanical instrumentation to carry out the judgment in accurate accordance with the managerially selected criteria. The invention is capable of implementing many different such criteria, illustrations of which are discussed below.

B. Measures of Resonance Information

A variety of measures of resonance characteristics may be considered in evaluating likelihood of machine failure. The inventors consider the following measures useful, but they do not intend to suggest that these are the only useful measures. Any measure that facilitates or implements a judgment procedure considered valid would be useful and appropriate to embody in the manner taught in this disclosure.

1. Mean frequency

The discussion in the specification to this point has implicitly been directed mainly to a principal measure of resonance information: the amplitude-weighted mean frequency $\bar{f}$, "f-bar," which may be defined as follows:

$$\bar{f} = (\text{Sigma } f_i A_i)/(\text{Sigma } A_i),$$

where $f_i$ is a frequency in the range $f_1$ to $f_2$, and $A_i$ is the amplitude of the signal for that frequency. All Sigmas in these formulas are taken from $i = f_1$ to $f_2$, where $f_1$ is the lowest frequency bin value in a resonance peak and $f_2$ is the highest frequency bin value in that peak.

2. Variance

The variance of frequency about $\bar{f}$, VAR(f), is a measure of how widely dispersed or spread out a peak is.

$$\text{VAR}(f) = (\text{Sigma } [f - \bar{f}]^2 A_i)/(\text{Sigma } A_i)$$

The inventors consider that an increase in VAR(f) indicates that differences in the physical characteristics of individual blade are arising.

3. Skewness

The skewness of f about $\bar{f}$ is a measure of the symmetry or assymetry of a peak around the mean, and may be defined as follows:

$$S(f) = (\text{Sigma}[f_i - \bar{f}]^4 \cdot A_i)/[\text{Sigma } A_i] \cdot [\text{VAR}(f)]^{1.5}.$$

4. Kurtosis

The kurtosis of f about $\bar{f}$ is a measure of "peakedness."

$$K(f) = (\text{Sigma}[f_i - \bar{f}]^3 \cdot A_i)/[\text{Sigma } A_i] \cdot [\text{VAR}(f)]^2.$$

Two curves can have the same variance but one can have more kurtosis (be more sharply peaked) than the other.

5. Other measures

Other measures of frequency characteristics within a peak exist. The foregoing are merely those associated with the exponents of $[f_i - \bar{f}]$ up to four. Further such measures may be employed with equal facility where they are considered of interest by users.

An additional measure, discussed below, is whether a side peak exists that is superimposed on a main peak under examination (and, in particular, as discussed below, whether the shape and/or location of the side peak is changing over time, relative to the main peak).

C. Thresholding

The foregoing measures are directed to values of frequency and amplitude at a given time. To determine whether a change in resonance information is occurring, suggesting a change in the physical characteristics of the equipment, historical data of a measure are taken. Then a comparison is made of values of the measure at different times. Thus, FIG. 9c illustrates observed values of $\bar{f}$ over time.

In general, these techniques use a thresholding approach. A threshold value of a measure of resonance information is predetermined for a single rotating component or a set of related components, such as a stage of a turbine. Then, observations are made until the predetermined threshold is reached or passed, whereupon an "alarm" condition is defined to exist.

The alarm and/or shutdown-judgment criteria are implemented into a subsystem within processing unit 36 that is referred to at times hereinafter as a comparator. The processing unit ascertains resonant information, that is, measured characteristics of the DFT and/or FFT spectral peaks relating to resonant modes of the machine component in question. This information or a report thereof is displayed on monitor 40a, presented by printer 40a, and/or stored in memory locations.

For example, the comparator compares a first signal $\bar{f}_1$ that is representative of an initial value of a measure of resonance information, such as mean resonant frequency, relating to a stage (set) of turbine blades (or other rotating equipment) with a second signal $\bar{f}_2$ that is representative of a subsequent value of that measure of resonance information for that stage. If $\bar{f}_1$ and $\bar{f}_2$ have a predetermined relationship defined in the system (that is, built into its hardware or software) as predictive of cracking, the comparator provides an output signal such as an alarm signal or a shutdown signal.

The following examples illustrate various thresholding approaches.

EXAMPLE 1

Turbine Alert by Fixed Threshold Method

A steam turbine with an L-0 stage having a mean resonant frequency of 78.00 Hz initial value for a blade is monitored with the control system of the invention, at monthly intervals. The following readings are registered:

| Month | 1 | 2 | 3 | 4 | ... | 18 | 19 |
|---|---|---|---|---|---|---|---|
| Res. Freq. | 77.98 | 77.99 | 77.98 | 77.97 | ... | 77.96 | 77.94 |

A first signal representative of a predetermined threshold frequency value, here 0.05 Hz, is stored. A second signal representative of an initial value of a mean resonant frequency of a turbine stage, here 78.00 Hz, is stored. This occurs at month 0, upon installation of the system.

At subsequent months 1, 2, 3 ... readings of mean resonant frequency for the turbine stage are made. That provides, each time, a third signal representative of a then-current value of mean resonant frequency for the turbine stage.

The third signal is subtracted from the second signal, providing a difference signal. If the difference signal does not exceed the first signal (threshold value 0.05 Hz), no action is taken and the procedure continues. This occurs through month 18.

At month 19, the difference signal exceeds the first signal, indicating that the threshold has been passed, so that the predetermined shutdown criterion has been met. An alarm and/or shutdown signal is sent and the turbine is shut down.

EXAMPLE 2

Shutdown of Turbine by Ratio Method

The same turbine is now monitored using the criterion that it should be shut down if blade resonant frequency falls below 99% of its initial value 78 Hz. The following readings are registered:

| Month     | 1     | 2     | 3     | 4     | ... | 18    | 19    | 20    |
|-----------|-------|-------|-------|-------|-----|-------|-------|-------|
| Res. Freq. | 77.98 | 77.99 | 77.98 | 77.97 | ... | 77.23 | 77.25 | 77.19 |

A first signal representative of a predetermined scalar constant c, here, 0.99, is stored. A second signal representative of an initial value of a mean resonant frequency of a turbine stage, here 78.00 Hz, is stored. The second signal is multiplied by constant c, here 0.99, to provide a third signal representative of 77.2 Hz. The third signal is stored.

The control system periodically monitors the rotating system. Each time, a fourth signal representative of a then-current value of mean resonant frequency for the stage is provided. The fourth signal is compared with the third signal. If the fourth signal exceeds the third signal, no action is taken and the procedure continues. This occurs through month 19.

At month 20, the fourth signal no longer exceeds the third signal, indicating that the 99% threshold has been passed, so that the predetermined shutdown criterion has been met. An alarm and/or shutdown signal is sent and the turbine is shut down.

More sophisticated statistical measures of change of mean frequency than the fixed-threshold can be used. A preferable approach is to use exponential (or geometric) smoothing or a similar moving-time average approach, in which noise excursions of current mean resonant frequency are factored out. One advantageous way to smooth the frequency signal, and determine whether an alarm condition exists, is illustrated by Example 3. This procedure shuts the turbine down only if mean resonant frequency starts decreasing (or increasing) at a much faster rate than it previously did.

EXAMPLE 3

Shutdown of Turbine by Geometric Smoothing

A first signal representative of an initial value of mean resonant frequency here 78 Hz, is stored as a base value. A second signal representative of a predetermined offset factor, here 0.1 Hz, is stored. A third signal representative of a predetermined smoothing-constant c, where $0<c<1$, is stored.

Notional data are tabulated below, based on the curve of FIG. 9c. The smoothing constant c is predetermined here as 40% (meaning that historic values receive a 60% weight and the most current value receives a weight of 40%). The values of c and offset factor are arbitrary, based on empirical data.

Current mean resonant frequency is measured periodically, in accordance with the procedures described above. Each time that current mean resonant frequency is observed or measured, its value is multiplied by 40%; the base or historic value is multiplied by 60%; and their sum S (the smoothed value) is compared with the current observed value, providing a difference signal D. Signal D is representative of how much the current value differs from the smoothed, historic value S.

If D is less than the predetermined offset factor, 0.1 Hz, that indicates that not much change is taking place. Therefore, no action is taken to shut the system down. Smoothed signal S is stored in place of the previous base value; it becomes the base value.

The procedure is repeated in this manner as long as D remains less than the predetermined offset factor, 0.1 Hz. However, if at any time difference signal D becomes equal to or exceeds 0.1 Hz, that indicates that the threshold has been passed, a definite and substantial change in mean resonant frequency has occurred, and an alarm condition exists. Accordingly, a shutdown signal is sent to the shutdown means and the system is shut down.

Illustrative data for this technique are tabulated below, based on the notional data of FIG. 9c. Month 100 represents the first "tick" on the X axis of FIG. 9c (note, suppressed zeros). Through month 110, the difference between base value and current frequency is less than 0.1 Hz. Month 110 shows an apparent sharp drop in mean resonant frequency, but as just a single reading it could be a random excursion.

The boldface entry for the last line and the last column—at month 112 indicates that the 0.1 Hz safety margin was passed and an alarm condition exists. Reference to FIG. 9c shows that this data corresponds to the very steep part of the curve at the far right, where two successive readings indicated that a definite change (not a mere random excursion) has taken place.

| Month | Curr. | c × Curr | Base    | (1-c) · Base | Sum     | Diff   | Offset-Diff |
|-------|-------|----------|---------|--------------|---------|--------|-------------|
| 100   | 78.00 | 31.2000  | 78.0000 | 46.8000      | 78.0000 | 0.0000 | 0.1000      |
| 102   | 77.99 | 31.1960  | 78.0000 | 46.8000      | 77.9960 | 0.0060 | 0.0940      |
| 104   | 77.98 | 31.1920  | 77.9960 | 46.7976      | 77.9896 | 0.0096 | 0.0904      |
| 106   | 77.96 | 31.1840  | 77.9896 | 46.7938      | 77.9778 | 0.0178 | 0.0822      |
| 108   | 77.95 | 31.1800  | 77.9778 | 46.7867      | 77.9667 | 0.0167 | 0.0833      |
| 110   | 77.88 | 31.1520  | 77.9667 | 46.7800      | 77.9320 | 0.0520 | 0.0480      |
| 112   | 77.74 | 31.0960  | 77.9320 | 46.7592      | 77.8552 | 0.1152 | −0.0152 |

A different approach for detecting prospective blade failure is to look for presence of blade subsets having a lower resonant frequency, as an indication that the subset is cracking, as shown in FIG. 9b. One way to do that is to "eyeball" the frequency distribution as shown on a monitor or in a report, to observe whether a formation of the configuration shown in FIG. 9b is beginning to form. Another approach is to monitor an appropriate measure of resonance information, such as skewness, S(f), defined in the preceding section. A shift downward accompanied by an increase in skewness is an indication that a subset of blades in a stage is changing resonant frequency, possibly because of corrosion or cracking. In any event, existence of such a shift would be considered a cause for concern by persons in the electric power generation industry.

EXAMPLE 4

Alarm Condition Based on Skewness

The procedure of Example 2 is repeated with the following changes: Instead of registering and processing mean frequency, skewness, S(f), is monitored. Instead of setting constant c at 0.99 to monitor for a 1% decrease in mean frequency, constant c is set at 1.05 to monitor for a 5% increase in skewness S(f), as previously defined.

The procedure, and its hardware or software implementation, are the same as that for Example 2, since the difference in parameters does not affect the means of implementation.

D. Shoulder Detection

It was previously indicated that appearance of a shoulder on a resonant frequency curve, for example, as in FIG. 9b, indicates that a subset within the 60–100 blades contributing to the curve are doing something different from the rest of the set. The sub-set is stiffening, cracking, corroding, or otherwise undergoing some change that may lead to a blade failure and thus to costly down time.

A shoulder-detection subsystem is now described for automatically monitoring and processing DFT and FFT data to detect formation of such a shoulder or side peak on a primary peak, in lieu of simply "eyeballing" for such an occurrence. Referring to FIG. 9a–9b, it is seen that a power spectrum of the type shown in these figures has a range of spectral amplitudes the envelope of which centers around a primary resonance peak. Such a portion of a Fourier Transform spectrum is referred to at times hereinafter as "spectral amplitudes characterizing a resonance peak.+

The subsystem described here processes the Fourier Transform spectral amplitudes characterizing a primary resonance peak to determine whether they include spectral amplitudes characterizing a secondary resonance peak or shoulder. This is accomplished by passing the Fourier Transform spectral amplitudes through an appropriate digital filter to attenuate the spectral amplitudes associated with the primary resonance peak for the whole set of 60–100 blades, and pass the spectral amplitudes associated with a shoulder or side peak, if one exists, for a subset of blades.

Several procedures for side-peak and shoulder detection are now described. For example, consider a primary resonant peak associated with 41 0.1-Hz spaced spectral bins from 76.0 Hz to 80.0 Hz. The maximum spectral amplitude is at 78.0 Hz. In addition, a secondary resonant peak is associated with a range of approximately seven 0.1-Hz spaced bins from 76.8 Hz to 77.4 Hz, and the amplitude difference between the secondary peak and the trough to its right is about 10% of the amplitude of the primary peak.

The subsystem reads the amplitudes for the 41 spectral bins associated with the primary peak, as well as for several bins below and above that range. The additional bins on each side are assumed to have spectral amplitudes of essentially zero. The 40+ spectral amplitudes define a first signal S, which contains the spectral amplitudes characterizing the primary peak (as well as those in the seven bins characterizing the secondary peak within the primary peak).

The subsystem then provides, as a second signal S', a moving average signal taken over several spectral bins flanking each bin (for example, 3–4 bins on each side of each bin—approximately the bandwidth of the secondary peak, where "bandwidth" refers here to the span of bins into which the secondary peak falls). This signal-processing procedure deemphasizes narrow bandwidth structure in first signal S (meaning structure associated with relatively few bins, as contrasted with wide bandwidth structure, which is that associated with a relatively greater number of bins, such as the 41 bins associated here with the primary peak). This signal-processing procedure can also be carried out by using a recursive digital filter, which can more effectively deemphasize the narrow bandwidth structure in first signal S. Next, the subsystem provides a third signal, difference signal S'', where S''=S-S'. That emphasizes the narrow bandwidth structure in the spectral amplitudes characterizing the resonant peak, relative to the wide bandwidth elements. While the primary peak (at 78.0 Hz in the spectral data) has greater amplitude than the secondary peak (at 77.1 Hz), that situation is reversed in the processed signal just described; the processed-signal amplitude is greater at 77.1 Hz than at 78.0 Hz. That permits detection of the existence of the secondary peak by any of several expedients.

Identification of a secondary peak is facilitated by subtracting from the foregoing third signal S'' a similar reference signal obtained by subjecting to the same procedures a first signal from a Fourier Transform spectrum for the same turbine where it is known that no secondary peak exists. The first signal can be derived from initial baseline data at the time of installation or before changes occur. By subtracting the first signal from the previously derived third signal, a fourth signal is provided that is representative of the narrow-bandwidth signal components of the secondary peak (if there is one), and eliminates unwanted contributions originating from limitations of the moving average filter.

Because smoothing and subtraction are linear operations, the order in which they are performed does not matter. Therefore, it is equivalent to the above to subtract a reference signal from a current signal, providing a difference signal; to smooth the difference signal, providing a smoothed difference signal which is representative of the wide-bandwidth signal components of the difference signal; and to subtract the smoothed difference signal from the difference signal, providing a final signal representative of the narrow-bandwidth signal components of the difference signal. The output signal is representative of changes in the narrow-bandwidth signal components of the difference signal, and thus of trends in secondary-peak formation, if any.

This approach is useful for extracting signals representative of a relatively small shoulder on a primary peak, for it is very powerful in filtering out for presentation narrow-bandwidth signal components that are not representative of the primary peak.

The presence of a shoulder or secondary peak may be detected by any procedure that picks up a local maximum in a region of interest. Thus, in any region having a primary peak, the region can be scanned, bin by bin, from a first Fourier amplitude value in excess of a predetermined threshold to the last such amplitude value in the set.

Other procedures for shoulder detection include storing baseline data at any time. On subsequent occasions, the same kind of data is read and the difference from the prior data is taken. The difference will be approximately zero if no change occurs, but will be nonzero in the event of a change such as that depicted in FIG. 9b. That permits detection of the existence of a secondary peak, if any, by any of several conventional expedients obvious to those skilled in the art. If installation data is unavailable, a model can be prepared from actual data, by fitting the latter to a Gaussian distribution or other appropriate resonance model by a least-squares method. Later actual data can then be compared with the model, in the manner just described.

For the foregoing shoulder-detection procedures to work properly, there must be enough spectral frequencies (bins) in the primary peak for both the main peak (for example, 78 Hz) to be processed and also for the narrower shoulder (if any) to be processed. The inventors consider that 20 to 40 spectral bins in this range is sufficient. Depending on the number of spectral frequencies in the DFT or FFT used, there will or will not be enough bins in the region of interest. If there are not enough bins in the region of interest, more must be provided.

One method is simply to expand the number of spectral frequencies in the whole FFT or DFT. That may be inconvenient or impractical, considering computation-speed and memory constraints. In such event, conventional techniques exist for expanding the data for the region of interest.

DFT and FFT approaches differ in a significant respect. The FFT algorithms in common use determine values for the whole set of spectral bins at once, so that computational time cannot be saved by excluding bins not of interest. However, DFT algorithms permit such bins to be excluded before values are determined, so that the time spent on unneeded regions can be saved. In both cases, though, data must first be taken for the entire data record. To focus in on a 4 Hz region with a minimum of 12 frequency bins, a data record at least 3 sec long should be used. A sample rate of 2400 per second (representing an 80-tooth bull gear and a 30 Hz shaft) would require an FFT of at least 4096 spectral bins and thus 8192 data points, which is the current practical limit for most off-the-shelf spectrum analyzers. Using DFT analysis instead would permit computations to be made for only 10% of the 4096 bins. Significant computational savings can be realized by using a DFT rather than FFT approach here, assuming that analysis of only a sufficiently limited portion of the frequency spectrum is satisfactory.

Complex signal heterodyning is a standard technique for "zooming" in on a spectral region of interest to provide more spectral bins in the region without having to determine values for spectral bins outside the region. Complex signal heterodyning permits DFT and FFT analysis to be performed using decimated data samples. These techniques are more economical than expanding the total number of spectral bins in the FFT or DFT, and are therefore considered preferable in practicing this invention. Zooming techniques are known to persons skilled in this art and are described in the literature.

GENERAL CONCLUDING REMARKS

Use of one or more of these signal-processing methods permits regular monitoring of rotating-component resonant vibration mode information during ordinary operation of the machine, so as to detect imminent failure before it occurs. Monitoring is carried out automatically, so that orderly shutdown can be accomplished before a catastrophic failure occurs.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, but rather comprehends the subject matter defined by the following claims.

Further, in various places in the specification illustrations have been given in terms of analog or digital filters or similar circuits, on the basis of whether analog or digital implementation means appeared more convenient. In general, any analog implementation can be replaced by a digital implementation, and vice versa. It is just a matter of chip availability and cost. Going from one implementation to the other will be an obvious expedient to persons skilled in the art. By the same token, in various places voltage models of circuits have been described (for example, frequency-to-voltage conversion of pulses), but utilization of the dual of such circuits (that is, using a current model) will be obvious to persons skilled in this art. Accordingly, it is considered that the invention described herein comprehends both digital and analog implementations, and both voltage and current duals, and claims directed to one or the other of the foregoing are intended to embrace the equivalent alternative implementation.

As used in the claims, the following terms have the following meanings:

"Vanes" includes rotors and propeller blades.

"Instantaneous frequency" of a pulse train and "spacing" of pulses in a pulse train are inverses of one another. Thus, if a pulse train from an encoder contains 2500 pulses per second, the frequency is 2500 Hz and the pulse spacing is 0.400 msec. If the spacing of these pulses decreases by 0.1%, or 400 nsec, the instaneous frequency of the pulse train will increase by 0.1%, or 2.5 Hz. In practicing this invention, changes in pulse spacing (i.e., instantaneous frequency) are monitored and subjected to signal processing, because they are representative of modulation of turbine shaft rotation speed by blade resonant vibrations, or (more generally) modulation of rotary machine system rotation rate by resonant vibrations of rotating elements of the system.

Reference to a sensor providing signals "representative of angular rotation" of the shaft of a rotary machine includes providing signals indicative of absolute value of shaft rotation rate or change in shaft rotation rate, and also absolute value of shaft angle or change in shaft angle.

"Data record" means a set of data provided by an analog-to-digital converter or similar device. For purposes of this invention, such data is ordinarily data representative of instantaneous frequency of shaft rotation of a rotating machine.

"Data segment" means a subset of data in a data record. For purposes of this invention, a data segment always contains data for exactly one complete shaft rotation (360°).

"Data point" means a single data reading in a data record, representing information for a specific instant in time. For purposes of this invention, a data segment always contains an integral number of consecutive data points.

"Sensor-pulse" refers to (a) a signal provided by a sensor or (b) a conditioned signal derived therefrom. Such conditioning means removal of noise, such as by low-pass filtering, and may include thresholding and/or removal of dc.

To "clock" an analog-to-digital converter means to cause it to provide a reading at its output, said output being a digital signal representative of the amplitude of an analog signal at the input of the analog-to-digital converter at the time when it is clocked.

"Spectral amplitudes characterizing a peak" refers to portions of a Fourier Transform power spectrum containing the amplitudes for particular spectral frequencies (bins) within the spectrum that mark the beginning and end of a resonance peak. For example: a turbine blade set may have a mean resonant frequency of 78 Hz; the Fourier Transform spectrum for that blade set has greatest amplitude at 78 Hz, and amplitudes at least 3 db less in spectral bins below 76 Hz and above 80 Hz. The spectral amplitudes characterizing this resonance peak are those in the spectral bins from 76 Hz to 80 Hz.

"Smoothing," with reference to signals from a Fourier Transform spectrum, means taking an average over several spectral frequencies (bins) on each side of a data point. For example, an arithmetically smoothed value of the signal for spectral bin n, taken over 7 bins, would be the arithmetic mean of the signals from bins $n-3$, $n-2$, $n-1$, $n$, $n+1$, $n+2$, and $n+3$. Smoothing is analogous to low-pass filtering a signal in the time domain.

"Narrow bandwidth structure," with reference to signals from a Fourier Transform spectrum, refers to a portion of a spectrum defined by signals from a relatively few bins, as in the case of a secondary peak or shoulder. "Wide bandwidth structure" refers to a portion of such a spectrum defined by signals from a relatively greater number of bins, as in the case of a primary peak. Smoothing such a signal tends to emphasize wide bandwidth structure relative to narrow bandwidth structure, while taking the difference between a signal and the same signal smoothed tends to emphasize narrow bandwidth structure relative to wide bandwidth structure.

The subject matter claimed is:

1. An apparatus for measuring resonance information for at least one rotating element of a rotary machine, said machine's rotating elements:
   comprising a shaft and one or more nonshaft rotating elements;
   having at least one resonant vibration mode; and
   rotating about an axis at a fundamental frequency of angular rotation modulated by oscillatory vibrations of at least one of said rotating elements;
said apparatus comprising:
   a sensor providing a train of N sensor-pulses in each complete 360°-rotation of said shaft, where:
      N is a positive integer;
      each of said N sensor-pulses is representative of an angular-rotation increment by said shaft; and
      said pulses, or the spacings therebetween, have an instantaneous frequency associated therewith;
   means for deriving from said train of sensor-pulses digital signals representative of a modulation of said fundamental frequency of angular rotation being caused by oscillatory motions of at least one of said rotating elements; and
   means for deriving from said digital signals a signal spectrum representative of frequency components present in said instantaneous frequency of said sensor-pulses, said signal spectrum containing signals representative of frequency and amplitude characteristics for said resonant mode, said means comprising spectral-analysis means for performing a Fourier Transform spectral analysis on said digital signals.

2. An apparatus according to claim 1 wherein said rotary machine is a turbine having a plurality of turbine blades attached to said shaft.

3. An apparatus according to claim 1 wherein said rotary machine is a rotary pump or an internal combustion engine driving vanes.

4. An apparatus for measuring resonance information for at least one rotating element of a rotary machine, said machine's rotating elements:
   comprising a shaft and one or more nonshaft rotating elements;
   having at least one resonant vibration mode; and
   rotating about an axis at a fundamental frequency of angular rotation modulated by oscillatory vibrations of at least one of said rotating elements;
said apparatus comprising:
   an alternator, driven by said rotary machine, providing an AC rotation-frequency signal having a fundamental frequency; and
   signal-processing means for deriving from said AC rotation-frequency signal further signals representative of frequency components that are contained within said AC rotation-frequency signal and modulate said fundamental frequency, said signal-processing means including spectral analysis means for performing a Fourier Transform spectral analysis on said further signals and deriving therefrom additional signals representative of frequency characteristics for said resonant vibration mode.

5. An apparatus according to claim 4 wherein said means for deriving signals comprises:
   means for comparing said AC rotation-frequency signal with an AC reference-frequency signal;
   means for deriving difference signals representative of a difference between said AC reference-frequency and said AC rotation-frequency; and
   means for subjecting said difference signals to spectral analysis and deriving therefrom said frequency components that modulate said fundamental frequency.

6. An apparatus for measuring resonance information for at least one rotating element of a rotary machine, said machine's rotating elements:
   comprising a shaft and one or more nonshaft rotating elements;
   having at least one resonant vibration mode; and
   rotating about an axis at a fundamental frequency of angular rotation modulated by oscillatory vibrations of at least one of said rotating elements;
said apparatus comprising:
   a sensor providing rotation signals representative of said frequency of angular rotation, where said sensor does not require for its use modification of the structure of the rotary machine and is capable of being located at any accessible point along the shaft of said machine;
   means for deriving from said rotation signals signal-components thereof representative of said modulation of said fundamental frequency of angular rotation being caused by oscillatory motions of at least one of said rotating elements; and
   signal-processing means for deriving from said signal-components a signal spectrum containing further signals representative of frequency and amplitude characteristics for said resonant mode, said signal-processing means including spectral analysis means for performing a Fourier Transform spectral analysis on said further signals and deriving therefrom additional signals representative of frequency characteristics for said resonant vibration mode.

7. An apparatus according to claim 6 further comprising a source of coherent electromagnetic radiation that beams said radiation onto said shaft, said radiation having a frequency; and wherein said sensor is a transducer for reading the frequency of said radiation which is absorbed by and re-emitted by said shaft, said re-emitted radiation having a change in said frequency representative of shaft rotation speed and direction.

8. An apparatus according to claim 6 wherein:
   said shaft is made of ferromagnetic material;
   said apparatus further comprises means for inducing a pattern of magnetic domains into the surface of said shaft;
   said sensor is an electromagnetic transducer located in the vicinity of said shaft, said transducer detecting presence of said induced magnetic domains as said shaft passes said transducer, and providing signals representative thereof; and
   said pickup signal is fed to means for deriving therefrom signals representative of time elapsed between detection of passage of successive said domains.

9. An apparatus for measuring resonance information for at least one rotating element of a rotary machine, said machine's rotating elements:
   comprising a shaft and one or more nonshaft rotating elements;
   having at least one resonant vibration mode; and
   rotating about an axis at a fundamental frequency of angular rotation modulated by oscillatory vibrations of at least one of said rotating elements;
said apparatus comprising:
   a sensor providing a train of N sensor-pulses in each complete 360°-rotation of said shaft, where:
      N is a positive integer;
      each of said N sensor-pulses is representative of an angular-rotation increment by said shaft; and
      said pulses have an instantaneous frequency associated therewith; and
   means for deriving from said train of sensor-pulses digital signals representative of a modulation of said fundamental frequency of angular rotation being caused by oscillatory motions of at least one of said rotating elements, said means comprising:
      f/v pulse-conversion means for deriving from said train of sensor-pulses, or from a signal derived from said train, an analog voltage signal whose amplitude is representative of said instantaneous frequency of said sensor-pulses;
      an analog-to-digital converter for deriving from said analog voltage signal digital signals representative of said instantaneous frequency of said sensor-pulses;
   means for deriving from said digital signals a signal spectrum representative of frequency components present in said instantaneous frequency of said sensor-pulses, said signal spectrum containing signals representative of frequency and amplitude characteristics for said resonant mode, said means comprising spectral-analysis means for performing a Discrete Fourier Transform spectral analysis on said digital signals in a manner that lessens spectral amplitudes of interference at shaft harmonic frequencies, said spectral-analysis means comprising electronic circuitry having:
      means for receiving said digital signals from said analog-to-digital converter and for providing, from said digital signals, DFT-signals representative of a Discrete Fourier Transform of a data record constituting a number of consecutive data segments, each said data segment constituting a set of consecutive said digital signals; and
      means for setting:
         the duration of each said data segment to a time interval containing exactly one complete rotation of said shaft;
         the number of said digital signals contained in each said data segment to an integer; and
         said number of data segments constituting said data record to an integer.

10. An apparatus according to claim 1 comprising a digital counter, wherein said sensor-pulses successively actuate a digital counter that provides count signals representative of said time elapsed between said sensor-pulses.

11. An apparatus according to claim 9 wherein said analog-to-digital conversion means is an analog-to-digital converter having a clock signal input port, and wherein said interference-control means comprises means:
   for feeding said sensor-pulses to said clock signal input port;
   for causing each of said data segments to contain data from a number of clock pulses representing exactly one complete 360°-rotation of said shaft; and
   for causing said data record to contain an integral number of said data segments.

12. An apparatus according to claim 1, having means for performing a Fast Fourier Transform spectral analysis on said digital signals, in a manner that lessens spectral amplitudes of interference at shaft harmonic frequencies, said means comprising:
   a pulse converter for convening said train of sensor-pulses into an analog voltage signal whose amplitude is representative of said instantaneous frequency;

an analog-to-digital converter for converting said analog voltage signal into said digital signals;

means for receiving said digital signals from said analog-to-digital conversion means and for providing therefrom signals representative of a Fast Fourier Transform of a data record constituting a number of consecutive data segments, each data segment constituting a set of consecutive said digital signals; and interference-control means for setting the duration of each said data segment to a time interval containing exactly one complete rotation of said shaft;

for setting the number of said digital signals contained in each said data segment to exactly an integral power of two, M; and for setting said number of data segments constituting said data record to exactly an integral power of two, M'.

13. An apparatus for measuring resonance information for at least one rotating element of a rotary machine, said machine's rotating elements:

comprising a shaft and one or more nonshaft rotating elements;

having at least one resonant vibration mode; and rotating about an axis at a fundamental frequency of angular rotation modulated by oscillatory vibrations of at least one of said rotating elements;

said apparatus comprising:

a sensor providing a train of N sensor-pulses in each complete 360°-rotation of said shaft, where:

N is a positive integer;

each of said N sensor-pulses is representative of an angular-rotation increment by said shaft; and said pulses have an instantaneous frequency associated therewith; and means for deriving from said train of sensor-pulses digital signals representative of a modulation of said fundamental frequency of angular rotation being caused by oscillatory motions of at least one of said rotating elements, said means comprising:

f/v pulse-conversion means for deriving from said train of sensor-pulses, or from a signal derived from said train, an analog voltage signal whose amplitude is representative of said instantaneous frequency of said sensor-pulses;

an analog-to-digital converter for deriving from said analog voltage signal digital signals representative of said instantaneous frequency of said sensor-pulses, said analog-to-digital converter having a clock-signal input port;

means for deriving from said digital signals a signal spectrum representative of frequency components present in said instantaneous frequency of said sensor-pulses, said signal spectrum containing signals representative of frequency and amplitude characteristics for said resonant mode, said means comprising spectral-analysis means for performing a Fast Fourier Transform spectral analysis on said digital signals in a manner that lessens spectral amplitudes of interference at shaft harmonic frequencies, said spectral-analysis means comprising electronic circuitry having:

means for receiving said digital signals from said analog-to-digital converter and for providing, from said digital signals, FFT-signals representative of a Fast Fourier Transform of a data record constituting a number of consecutive data segments, each said data segment constituting a set of consecutive said digital signals;

a multiplier-divider having means for:

receiving said train of sensor pulses having N sensor-pulses for each complete 360°-rotation of said shaft;

multiplying said pulses by a first factor, providing a product, and dividing said product by a second factor, providing a quotient, said first and second factors being such that said quotient is an integral power of two, M; and providing a further pulse train containing M pulses for each complete 360°-rotation of said shaft; and means for feeding said further pulse train to said clock-signal input port of said analog-to-digital converter, whereby:

the duration of each said data segment is set to a time interval containing exactly one complete rotation of said shaft;

the number of said digital signals in each data segment is set to exactly an integral power of two, M; and said number of data segments constituting said data record is set to exactly an integral power of two, M'.

14. An apparatus for measuring resonance information for at least one rotating element of a rotary machine, said machine's rotating elements:

comprising a shaft and one or more nonshaft rotating elements;

having at least one resonant vibration mode; and rotating about an axis at a fundamental frequency of angular rotation modulated by oscillatory vibrations of at least one of said rotating elements;

said apparatus comprising:

a sensor providing a train of N sensor-pulses in each complete 360°-rotation of said shaft, where:

N is a positive integer;

each of said N sensor-pulses is representative of an angular-rotation increment by said shaft; and said pulses have an instantaneous frequency associated therewith; and means for deriving from said train of sensor-pulses digital signals representative of a modulation of said fundamental frequency of angular rotation being caused by oscillatory motions of at least one of said rotating elements, said means comprising:

a low-pass pulse filter for receiving said train of sensor-pulses, or a signal derived therefrom, said filter having a cutoff frequency that is lower than half of a clocking frequency and is higher than a highest frequency-component of interest present in said train of sensor-pulses or signal derived therefrom, said filter providing as its output an anti-aliased pulse train;

means for receiving said train of sensor-pulses or signal derived therefrom and removing from said train of sensor pulses or signal derived therefrom signal components representative of said modulation of said fundamental frequency of angular rotation, thereby providing an unmodulated pulse train; and analog-to-digital conversion means for providing as an output digital signals representative of said instantaneous frequency of said sensor-pulses, without an intermediate frequency-to-voltage conversion before digitization, said analog-to-digital conversion means having a clock-signal input for receiving said unmodulated pulse train as a clocking signal for said conversion and having an analog signal input for receiving said anti-aliased pulse train; and means for deriving from said digital signals resonance-information signals representative of frequency and amplitude characteristics for said resonant mode, said means comprising means for subjecting said digital signals to Fourier Transform spectral analysis, providing a signal spectrum representative of frequency components present in said instantaneous frequency of said sensor-pulses.

15. An apparatus according to claim 14 wherein said means for removing from said train of said sensor-pulses signal components representative of said modulation of said frequency of angular rotation comprises a means for narrow band-pass filtration of said train, wherein a passband centers on a mean frequency $f_o$ of said sensor-pulses and extends above and below said $f_o$ through frequencies $(f_o+f_1)$ to $(f_o-f_1)$, where $f_1$ is less than the lowest frequency of interest among said signal components representative of said modulation of said frequency of angular rotation.

16. An apparatus according to claim 15 wherein said means for removing from said train of said sensor-pulses signal components representative of said modulation of said frequency of angular rotation comprises:

a phase-lock-loop pulse-multiplier circuit set to multiply input pulse rate by at least 2, said circuit comprising a signal input port;

a low-pass filter; and a voltage-controlled oscillator having an output port;

means for feeding said train of said sensor-pulses to said signal input port;

said low-pass filter having a cut-off frequency less than the lowest frequency of interest among said signal components representative of said modulation of said frequency of angular rotation; and means for accepting a signal from said output port of said voltage-controlled oscillator, said signal constituting said further pulse train.

17. An apparatus according to claim 15, wherein said signal spectrum comprises a set of signal-components, each of which corresponds to one of a set of discrete spectral frequencies spaced from one another by spectral-frequency intervals k, each said signal-component having a spectral amplitude and phase; said apparatus being adapted to separate signal-components in said signal spectrum that are representative of frequency modulation of said frequency of angular rotation, and signal-components therein representative of amplitude modulation thereof, from one another and from noise; said apparatus comprising:

means for providing from said signal spectrum a first signal representative of spectral phase and amplitude for a first spectral frequency which is that spectral frequency nearest to frequency $\omega_o$, where $\omega_o$ is mean sensor-pulse repetition rate;

means for providing from said signal spectrum a second signal representative of spectral phase and amplitude for a second spectral frequency higher than said first spectral frequency by n number of spectral-frequency intervals, where n is an integer and $n \geq 0$, so that said second spectral frequency is within one spectral-frequency interval of a signal-component frequency $\omega_o+\omega'$, where $\omega'=nk$;

means for providing from said signal spectrum a third signal representative of spectral phase and amplitude for a third spectral frequency less than said first spectral frequency by said n number of spectral-frequency intervals, so that said third spectral frequency is within one spectral-frequency interval of a signal-component frequency $\omega_o-\omega'$, where $\omega'=nk$;

means for processing said first, second, and third signal to provide signals representative of whether $\omega_o+\omega'$ and $\omega_o-\omega'$ are sidebands that originate from sources that modulate frequency $\omega_o$.

18. An apparatus according to claim 17 wherein said means for processing said first, second, and third signals comprises:

means for providing a fourth signal representative of the complex conjugate of the square of said first signal;

multiplying means for providing a fifth signal representative of the product of said second signal, said third signal, and said fourth signal;

summing means for providing a sixth signal representative of the sum of said fifth signals over a set of M data records, where M is an integer;

means for providing a seventh signal representative of the square of the absolute value of said first signal;

further summing means for providing an eighth signal representative of the sum of said seventh signals over said set of M data records;

dividing means for providing a ninth signal representative of the quotient of said sixth signal as dividend and said eighth signal as divisor, the amplitude of said ninth signal being representative of whether $\omega_o+\omega'$ and $\omega_o-\omega'$ are sidebands that originate from sources that modulate frequency $\omega_o$.

19. An apparatus according to claim 1 comprising a comparator for comparing a first signal representative of an initial value of resonance information for at least one of said rotating elements, and a second signal representative of at least one subsequent value of said resonance information; and for providing an output signal representative of whether said first and second signals have a predetermined relationship indicating a change in said values.

20. An apparatus according to claim 19 wherein said predetermined relationship indicating a change in said values is defined by a threshold.

21. An apparatus according to claim 20 wherein said threshold is defined in terms of whether said subsequent value exceeds one of the following:

(a) a sum of said initial value and a predetermined threshold value;

(b) a product of said initial value and a predetermined constant; or (c) a sum of a predetermined threshold value and a smoothed-value of a set of historic values of said subsequent values.

22. An apparatus according to claim 19 wherein said resonance information is mean resonant frequency or is variance around mean resonant frequency, skewness around mean resonant frequency, or kurtosis around mean resonant frequency.

23. An apparatus according to claim 19 in combination with:
shutdown means for shutting said rotary machine down when said means is actuated, and wherein said output signal actuates said shutdown means, thereby shutting down said machine; and/or
alarm means for providing an alarm signal, actuated by said output signal.

24. An apparatus according to claim 1, wherein said means for deriving resonance-information signals comprises:
means for providing a Fourier Transform signal spectrum representative of frequency components present within said frequency of angular rotation; and
means for processing said signal spectrum for a set of rotating elements having a primary peak of resonant frequencies, to determine whether a subset of said set of rotating elements has formed within said set, said subset having a secondary peak of resonant frequencies differing from said primary peak.

25. An apparatus according to claim 24 wherein said means for processing said signal spectrum comprises:
means for providing a first signal representative of spectral amplitudes of said spectrum characterizing said primary peak; and
selection means for processing said first signal to deemphasize spectral amplitudes characterizing said primary peak, relative to spectral amplitudes characterizing said secondary peak, if any.

26. An apparatus according to claim 25 wherein said selection means comprises:
means for storing an initial set of values of said first signal;
means for comparing therewith a subsequent set of values of said first signal, thereby producing a second signal representative of changes, if any, that have occurred in said first signal; and
means for measuring said second signal.

27. An apparatus according to claim 25 wherein said selection means comprises:
means for smoothing said first signal, providing a smoothed signal representative of wide bandwidth structure in said first signal;
subtracting means for providing a difference signal representative of a difference between said first signal and said smoothed signal, and representative of narrow bandwidth structure in said first signal.

28. An apparatus according to claim 25 wherein said selection means comprises:
means for providing a reference signal representative of an initial set of values of said first signal;
means for providing a current signal representative of a subsequent set of values of said first signal;
means for subtracting said reference signal from said current signal, providing a difference signal;
means for smoothing said difference signal, providing a smoothed difference signal representative of wide bandwidth structure in said difference signal;
means for subtracting said smoothed difference signal from said difference signal, providing an output signal representative of narrow bandwidth structure in said difference signal, and representative of differences, if any, that have occurred between narrow bandwidth structures of said reference and current signals.

29. An apparatus according to claim 28 wherein said means for providing a first signal includes a spectral zoom circuit for zooming in on spectral bins containing frequencies from the beginning to the end of said primary peak.

30. A machine system comprising:
a rotary machine, said machine having a shaft rotating at an angular rotation frequency, said shaft having rotating elements attached thereto and rotated thereby, said shaft and said elements having resonant vibration modes, and said shaft's angular rotation frequency being a fundamental frequency of angular rotation modulated by oscillatory vibrations of at least one of said rotating elements;
shutdown means for shutting said machine down upon receipt of a shutdown signal and/or alarm means for providing an alarm upon receipt of a shutdown signal;
a sensor for providing signals representative of said angular rotation frequency of said shaft;
signal-processing means for detecting from said signals signal-components thereof representative of said modulation of said fundamental frequency of angular rotation by said oscillatory vibrations, and for deriving from said signal-components resonant-frequency signals representative of frequency and amplitude characteristics for said resonant modes;
a comparator
for comparing a first signal representative of an initial value or resonance information for at least one of said shaft and/or rotating elements with a second signal representative of at least one subsequent value of said resonance information; and
for providing an output signal representative of whether said first and second signals have a predetermined relationship indicating a shift in said resonance information; and
means for sending said output signal as a shutdown signal to said shutdown means and/or to said alarm means.

31. A method for measuring resonance information for at least one rotating element of a rotary machine, said rotary machine's rotating elements:
comprising a rotating shaft and one or more nonshaft rotating elements;
having at least one resonant mode; and
rotating about an axis at a fundamental frequency of angular rotation that is modulated by oscillatory vibrations of at least one of said rotating elements;
said method comprising:
(1) obtaining from a sensor monitoring said machine a rotation signal representative of said shaft's frequency of angular rotation, said sensor being one that provides a train of sensor-pulses, where:
there are N sensor-pulses for each 360° rotation of said shaft, where N is a positive integer;
each of said N sensor-pulses is representative of an angular-rotation increment by said shaft; and
said pulses, or the spacings therebetween, have an instantaneous frequency associated therewith;
(2) electronically deriving from said rotation signal further signals representative of said modulation of said fundamental frequency of angular rotation by said oscillatory vibrations of at least one of said rotating elements;
(3) feeding said further signals to a electronic device for performing Fourier Transform spectral analysis, providing a signal spectrum representative of instantaneous frequency components present in said pulse train, or in the spacing thereof, and deriving therefrom resonance-information signals representative of frequency and amplitude characteristics for said resonant vibration mode.

32. A method according to claim 31 wherein said rotary machine is a turbine having a plurality of turbine blades attached to said shaft.

33. A method according to claim 31 wherein said rotary machine is a rotary pump or an internal combustion engine driving vanes.

34. A method for measuring resonance information for at least one rotating element of a rotary, machine, said machine's rotating elements;
comprising a rotating shaft and one or more nonshaft rotating elements;
having at least one resonant vibration mode; and
rotating about an axis at a fundamental frequency of angular rotation modulated by oscillatory vibrations of at least one of said rotating elements;
said method comprising:
(1) driving from said shaft an alternator providing an AC rotation-frequency signal having a fundamental frequency; and
(2) extracting from said AC rotation-frequency signal signals representative of frequency components therein that modulate said fundamental frequency.

35. A method according to claim 34 wherein said said further signals are derived from said AC rotation-frequency signal by:
(a) comparing said AC rotation-frequency signal with an AC reference-frequency signal;
(b) deriving difference signals representative of a difference between said AC reference-frequency and said AC rotation-frequency; and
(c) subjecting said difference signals to spectral analysis and deriving therefrom said frequency components that modulate said fundamental frequency.

36. A method for measuring resonance information for at least one rotating element of a rotary machine, said machine's rotating elements:
comprising a shaft and one or more nonshaft rotating elements;
having at least one resonant vibration mode; and
rotating about an axis at a fundamental frequency of angular rotation modulated by oscillatory vibrations of at least one of said rotating elements;
said method comprising:
(1) registering from a sensor rotation signals representative of said frequency of angular rotation, where said sensor does not require modification of the structure of the rotary machine and is capable of being located at any accessible point along the shaft of said machine;
(2) deriving from said rotation signals signal-components thereof representative of said modulation of said fundamental frequency of angular rotation being caused by oscillatory motions of at least one of said rotating elements; and
(3) deriving from said signal-components a signal spectrum containing further signals representative of frequency and amplitude characteristics for said resonant mode, performing a Fourier Transform spectral analysis on said further signals, and deriving therefrom additional signals representative of frequency characteristics for said resonant vibration mode.

37. A method according to claim 36 comprising:
(a) inducing a pattern of magnetized domains into the surface of said shaft;
(b) placing an electromagnetically sensitive transducer in the vicinity of said shaft; and
(c) sensing passage of said magnetized domains, whereby said rotation signals are obtained.

38. A method according to claim 36 wherein said rotation signal is obtained by:
(a) beaming coherent electromagnetic radiation onto said shaft, said radiation having an initial frequency;
(b) placing an optical pickup in the vicinity of said shaft and sensing radiation absorbed and re-emitted by said shaft, said re-emitted radiation having a re-emission frequency; and
(c) determining the change in frequency between said initial frequency and said re-emission frequency, said change being representative of shaft rotation speed and direction.

39. A method according to claim 31 wherein said rotation signal is obtained by an optical pickup sensing reflections from markings on said shaft.

40. A method according to claim 31 wherein said rotation signal is obtained by measuring the time interval between occurrence of successive said sensor-pulses.

41. A method according to claim 40 wherein said time interval is measured by a digital counter successively actuated by said sensor-pulses.

42. A method for measuring resonance information for at least one rotating element of a rotary machine, said rotary machine's rotating elements:
comprising a rotating shaft and one or more nonshaft rotating elements;
having at least one resonant mode; and
rotating about an axis at a fundamental frequency of angular rotation that is modulated by oscillatory vibrations of at least one of said rotating elements;
said method comprising:
(1) obtaining a rotation signal representative of said shaft's frequency of angular rotation, from a sensor that provides a train of sensor-pulses, where:
there are N sensor pulses for each 360° rotation of said shaft, where N is a positive integer;
each of said N sensor-pulses is representative of an angular-rotation increment by said shaft; and
said pulses have an instantaneous frequency associated therewith;
(2) electronically deriving from said rotation signal further signals representative of said modulation of said fundamental frequency of angular rotation by said oscillatory vibrations, by:
(a) feeding said train of sensor-pulses to a frequency-to-voltage converter which:
(A) feeds to an input port of an integrator a predetermined quantity of charge for each of said sensor-pulses, whereby said integrator registers a predetermined voltage increment for each angular-rotation increment;
(B) allows charge to leak from said integrator through an output resistor in accordance with a predetermined time constant, providing a sawtooth wave as output voltage signal;
(C) feeding said output voltage signal to a low-pass filter; and
(D) smoothing said sawtooth wave by said filter, providing an analog voltage signal whose amplitude is representative of instantaneous frequency of said sensor-pulses;

(b) feeding said analog voltage signal to an analog-to-digital converter, which provides at its output digital signals representative of instantaneous frequency of said sensor-pulses, as said further signals;

(3) feeding said further signals to an electronic device for performing spectral analysis, providing a signal spectrum representative of frequency components present in said pulse train or in the spacing thereof, and deriving therefrom resonance-information signals representative of frequency and amplitude characteristics for said resonant vibration mode.

43. A method for measuring resonance information for at least one rotating element of a rotary machine, said rotary machine's rotating elements:

comprising a rotating shaft and one or more nonshaft rotating elements;

having at least one resonant mode; and rotating about an axis at a fundamental frequency of angular rotation that is modulated by oscillatory vibrations of at least one of said rotating elements;

said method comprising:

(1) obtaining a rotation signal representative of said shaft's frequency of angular rotation, from a sensor that provides a train of sensor-pulses, where:

there are N sensor-pulses for each 360° rotation of said shaft, where N is a positive integer;

each of said N sensor-pulses is representative of an angular-rotation increment by said shaft; and said pulses have an instantaneous frequency associated therewith;

(2) electronically deriving from said rotation signal further signals representative of said modulation of said fundamental frequency of angular rotation by said oscillatory vibrations, by:

(a) feeding said train of sensor-pulses to a frequency-to-voltage converter which provides an analog voltage signal whose amplitude is representative of instantaneous frequency of said sensor-pulses;

(b) feeding said analog voltage signal to an analog-to-digital converter, which provides at its output digital signals representative of instantaneous frequency of said sensor-pulses, as said further signals;

(3) feeding said further signals to an electronic device for performing Discrete Fourier Transform spectral analysis, providing a signal spectrum representative of frequency components present in said pulse train or in the spacing thereof, and deriving therefrom resonance-information signals representative of frequency and amplitude characteristics for said resonant vibration mode, where said device performs said spectral analysis in a manner that lessens spectral amplitudes of interference at shaft harmonic frequencies, by:

(a) providing a data record constituting a number of consecutive data segments, each said data segment constituting a set of consecutive said digital signals (b) making the duration of each said data segment a time interval containing exactly one complete rotation of said shaft;

(c) making the number of said digital signals contained in said data segment an integer;

(d) making said number of data segments constituting said data record an integer; and (e) subjecting said digital signals constituting said data record to a Discrete Fourier Transform analysis.

44. A method according to claim 43 in which said analog-to-digital converter is clocked by:

(a) routing said sensor pulses to a clock signal input port of said analog-to-digital converter, providing clock pulses;

(b) counting said clock pulses for each said data segment until said data segment contains data from a number of said clock pulses exactly representing one complete 360°-rotation of said shaft, and thereupon terminating said data segment; and (c) counting said data segments for each said data record until said data record contains an integral number of said data segments, and thereupon terminating said data record.

45. A method according to claim 44, for performing a Fast Fourier Transform spectral analysis on said digital signals provided by said analog-to-digital converter, in a manner that lessens spectral amplitudes of interference at shaft harmonic frequencies, said method comprising:

(a) providing a data record constituting a number of consecutive data segments, each said data segment constituting a set of consecutive said digital signals;

(b) making the duration of each said data segment a time interval containing exactly one complete rotation of said shaft;

(c) making the number of said digital signals signals contained in each said data segment exactly an integral power of two;

(d) making said number of data segments constituting said data record exactly an integral power of two; and (e) subjecting said digital signals constituting said data record to a Fast Fourier Transform analysis in an electronic spectrum analyzer.

46. A method according to claim 45 in which said analog-to-digital converter is clocked by:

(a) routing said sensor pulses to an input port of a pulse multiplier-divider circuit;

(b) therein providing a further pulse train in which a number M of pulses, exactly equal to an integral power of two, occur in an interval of time in which one complete 360°-rotation of said shaft occurs;

(c) routing said further pulse train to a clock signal input port of said analog-to-digital converter;

(d) clocking said analog-to-digital converter with said further pulse train as clock pulses;

(e) counting said clock pulses for each said data segment until said data segment contains data from said number M clock pulses, and thereupon terminating said data segment; and (e) counting said data segments for each said data record until said data record contains M' said data segments, and thereupon terminating said data record, where M' is an integral power of two.

47. A method for measuring resonance information for at least one rotating element of a rotary machine, said rotary machine's rotating elements:

comprising a rotating shaft and one or more nonshaft rotating elements; having at least one resonant mode; and rotating about an axis at a fundamental frequency of angular rotation that is modulated by oscillatory vibrations of at least one of said rotating elements;

said method comprising:

(1) obtaining a rotation signal representative of said shaft's frequency of angular rotation, from a sensor that provides a train of sensor-pulses, where:
   there are N sensor-pulses for each 360° rotation of said shaft, where N is a positive integer;
   each of said N sensor-pulses is representative of an angular-rotation increment by said shaft; and
   said pulses have an instantaneous frequency associated therewith;
(2) electronically deriving from said rotation signal further signals representative of said modulation of said fundamental frequency of angular rotation by said oscillatory vibrations, by:
   (a) feeding said train of sensor-pulses, or a signal derived therefrom, to a low-pass filter whose cutoff frequency is lower than half a clocking frequency and is higher than a highest frequency component of interest present in said train of sensor-pulses, providing an anti-aliased pulse train;
   (b) feeding said anti-aliased pulse train to an analog-to-digital converter, which provides at its output digital signals representative of instantaneous frequency of said sensor-pulses, as said further signals, said analog-to-digital converter having a clock-signal input port to which a clocking signal is fed;
   (c) feeding said train of sensor-pulses, or a signal derived therefrom, to a means for removing therefrom signal-components representative of said modulation of said fundamental frequency of angular rotation, thereby providing an unmodulated pulse train;
   (d) feeding said unmodulated pulse train to said clock-signal input port of said analog-to-digital converter as said clocking signal, and clocking said analog-to-digital converter therewith (for purposes of step 2b);
(3) feeding said further signals to an electronic device for performing Fourier Transform spectral analysis, providing a signal spectrum representative of instantaneous frequency components present in said pulse train or in the spacing thereof, and deriving therefrom resonance-information signals representative of frequency and amplitude characteristics for said resonant vibration mode.

48. A method according to claim 47 wherein said signal components representative of said modulation of said frequency of angular rotation are removed from said train of sensor-pulses by passing said train through a narrow band-pass filter having a pass band that centers on a mean frequency $f_o$ of said sensor-pulses and extends above and below said $f_o$ through frequencies $f_o+f_l$ to $f_o-f_l$, where $f_l$ is less than the lowest frequency of interest among said signal components representative of said modulation of said frequency of angular rotation.

49. A method according to claim 47 wherein said signal components representative of said modulation of said frequency of angular rotation are removed from said train of sensor-pulses by:
   (a) feeding said train of said sensor-pulses to a signal input port of an electronic circuit, which feeds one input port of a phase-comparator circuit, said circuit providing a comparator output pulse train at a comparator output port;
   (b) feeding said comparator output pulse train from said comparator output port to an input port of a low-pass filter having a cut-off frequency less than the lowest frequency of interest among said signal components representative of said modulation of said frequency of angular rotation, said filter providing at its output port a filtered pulse train;
   (c) feeding said filtered pulse train to an input port of a voltage-controlled oscillator, providing a VCO output pulse train at an output port of said oscillator;
   (d) routing said VCO output pulse train to a pulse-divider circuit;
   (e) therein dividing spacing in said VCO output pulse train by a factor of at least two, providing a divided pulse train;
   (f) feeding said divided pulse train to a second input port of said phase comparator circuit; and
   (g) additionally routing said VCO output pulse train away from said phase-lock-loop pulse-multiplier circuit as said further pulse train.

50. A method according to claim 48, wherein said signal spectrum comprises a set of signal-components, each of which corresponds to one of a set of discrete spectral frequencies spaced from one another by spectral-frequency intervals k, each said signal-component having a spectral amplitude and phase; said method being adapted to separate signal-components in said signal spectrum that are representative of frequency modulation of said frequency of angular rotation, and signal-components therein representative of amplitude modulation thereof, from one another and from noise; said method comprising:
   (a) extracting from said signal spectrum a first signal representative of spectral phase and amplitude for a first spectral frequency which is that spectral frequency nearest to frequency $\omega_o$, where $\omega_o$ is mean sensor-pulse repetition rate;
   (b) extracting from said signal spectrum a second signal representative of spectral phase and amplitude for a second spectral frequency higher than said first spectral frequency by n number of spectral-frequency intervals, where n is an integer and $n \geq 0$, so that said second spectral frequency is within one spectral-frequency interval of a signal component frequency $\omega_o+\omega'$, where $\omega=nk$;
   (c) extracting from said signal spectrum a third signal representative of spectral phase and amplitude for a third spectral frequency less than said first spectral frequency by said n number of spectral-frequency intervals, so that said third spectral frequency is within one spectral-frequency interval of a signal-component frequency $\omega_o-\omega'$, where $\omega'=nk$; and
   (d) electronically processing said first, second, and third signals to provide a further signal representative of sideband frequencies originating from sources modulating said frequency $\omega_o$.

51. A method according to claim 50 in which step (d) comprises the following steps:
   (i) providing a fourth signal representative of phase and amplitude of the complex conjugate of the square of said first signal;
   (ii) providing a fifth signal representative of phase and amplitude of the product of said second signal, said third signal, and said fourth signal;
   (iii) providing a sixth signal representative of the sum of said fifth signals over a set of M data records, where M is an integer; (iv) providing a seventh signal representative of the square of the absolute value of said first signal;

(v) providing an eighth signal representative of the sum of said seventh signals over said set of M data records;

(vi) providing a ninth signal whose amplitude is representative of said sixth signal divided by said eighth signal, said amplitude of said ninth signal also being representative of whether $\omega_o + \omega'$ and $\omega_o - \omega'$ are frequencies originating from sources modulating said frequency $\omega_o$.

52. The method of claim 51 wherein the steps are repeated for a plurality of said frequencies $\omega'$, thereby determining which of said frequencies $\omega'$, if any, are representative of resonance information.

53. A method according to claim 31 wherein, after steps 1-3, the following additional steps occur:

(4) providing a first signal representative of an initial value of resonance information for at least one of said rotating elements of said machine;

(5) providing a second signal representative of at least one subsequent value of said resonance information for said rotating element;

(6) comparing said first signal with said second signal and providing an output signal representative of whether said first and second signals have a predetermined relationship indicating a shift in said resonance information.

54. The method of claim 53 Wherein said predetermined relationship is defined in terms of exceeding a threshold.

55. A method according to claim 53 wherein the following additional step occurs after step (6):

(7) sending said output signal to an alarm means, thereby actuating said alarm means; and/or sending said output signal to a shutdown means that shuts down said rotary machine upon receiving said shutdown signal.

56. A method according to claim 31 in which:

(a) said rotation signals are subjected to signal-processing that provides a Fourier Transform signal spectrum representative of frequency components present within said frequency of angular rotation, a portion of said signal spectrum comprising spectral amplitudes characterizing a primary peak of resonant frequencies; and (b) said signal spectrum is then further processed to determine whether a subset of spectral amplitudes, which are within said portion of said spectrum characterizing said primary peak, characterizes a secondary peak of resonant frequencies.

57. A method according to claim 31 whereby resonance information for a set of rotating elements having a primary peak of resonant frequencies is spectrally analyzed to determine whether a subset of said set of rotating elements has formed within said set, said subset having a secondary peak of resonant frequencies differing from said primary peak-said method comprising the following additional steps after steps 1-3:

(4) providing a first signal representative of Fourier Transform spectral amplitudes characterizing said primary peak of resonant frequencies;

(5) providing a second signal in which spectral amplitudes in said first signal having wide bandwidth structure are deemphasized relative to spectral amplitudes having narrow bandwidth structure; and (6) analyzing said second signal to measure whether spectral amplitudes of narrow bandwidth structure occur in spectral bins not in the immediate vicinity of said primary peak of resonant frequencies.

58. A method according to claim 57 wherein said relative deemphasizing in said first signal of spectral amplitudes having wide bandwidth structure, as described in step 5 of said method, comprises:

(a) smoothing said first signal, thereby providing a smoothed signal representative of wide bandwidth structure in said first signal;

(b) subtracting said smoothed signal from said first signal, providing a steepened signal representative of narrow bandwidth structure in said first signal.

59. A method according to claim 58 in which a current spectral signal is compared with an earlier spectral signal to determine whether said current signal contains relatively greater secondary peak structure than said earlier signal, said method comprising:

(i) subjecting said earlier signal to said steps (a) and (b), thereby providing a reference steepened signal representative of narrow bandwidth structure in said earlier signal;

(ii) subjecting said current signal to said steps (a) and (b), thereby providing a current steepened signal representative of narrow bandwidth structure in said current signal;

(iii) subtracting said reference steepened signal from said current steepened signal, thereby providing a difference signal representative of increase, if any, in narrow bandwidth structure between said reference and current signals.

60. A method according to claim 57 wherein said first signal is spectrally zoomed to zoom in on spectral bins containing frequencies from the beginning to the end of said primary peak.

61. A method of operating a machine system and anticipating occurrence of resonance phenomena therein, said system comprising a rotary machine, said machine comprising a rotating shaft and rotating elements attached to said shaft and rotated thereby, said shaft and said rotating elements having resonant vibration modes, and said shaft's angular rotation frequency being a fundamental frequency of angular rotation modulated by oscillatory vibrations of at least one of said rotating elements; said method comprising:

(1) obtaining a signal representative of said shaft's frequency of angular rotation;

(2) deriving from said signal further signals representative of said modulation of said frequency by oscillations of at least one said rotating element and/or shaft;

(3) processing said further signals by detecting therefrom signal-components thereof representative of said modulation of said fundamental frequency of angular rotation by said oscillatory vibrations and deriving from said signal-components resonance-information signals representative of amplitude and frequency characteristics for at least one said resonant vibration mode;

(4) storing said resonance-information signals;

(5) periodically fetching from storage and comparing current and historic values of said resonance-information signals;

(6) providing an output alarm signal if said current values differ from said historic values by more than a predetermined threshold value; and (7) sounding an alarm and/or shutting down said system if said output alarm signal is provided.

* * * * *